(12) United States Patent  
Vohariwatt et al.

(10) Patent No.: US 7,529,408 B2  
(45) Date of Patent: May 5, 2009

(54) SYSTEM AND METHOD FOR ELECTRONICALLY PROCESSING DOCUMENT IMAGES

(75) Inventors: Janet Vohariwatt, San Diego, CA (US); Breese M. Remele, Lakeside, CA (US); Richard A. Busch, San Diego, CA (US); Donnie D. Huynh, San Diego, CA (US); Mark Cao, Costa Mesa, CA (US)

(73) Assignee: iChannex Corporation, San Diego, CA (US)

( * ) Notice: Subject to any disclaimer, the term of this patent is extended or adjusted under 35 U.S.C. 154(b) by 225 days.

(21) Appl. No.: 11/296,182

(22) Filed: Dec. 6, 2005

(65) Prior Publication Data

US 2006/0190489 A1 Aug. 24, 2006

Related U.S. Application Data

(60) Provisional application No. 60/655,531, filed on Feb. 23, 2005, provisional application No. 60/684,866, filed on May 26, 2005, provisional application No. 60/688,969, filed on Jun. 9, 2005, provisional application No. 60/708,263, filed on Aug. 9, 2005, provisional application No. 60/718,628, filed on Sep. 19, 2005.

(51) Int. Cl.  
*G06K 9/34* (2006.01)  
*G06K 9/54* (2006.01)  
*G06K 9/60* (2006.01)

(52) U.S. Cl. .............. 382/180; 382/305; 715/234; 715/243; 707/104.1; 399/361

(58) Field of Classification Search ............... 382/112, 382/173, 180, 305, 306; 358/1.9, 1.12–1.18, 358/474; 715/209, 234, 243; 707/104.1; 399/361  
See application file for complete search history.

(56) References Cited

U.S. PATENT DOCUMENTS

| 4,817,169 | A  | * | 3/1989  | Peppers et al.     | 382/173  |
|-----------|----|---|---------|--------------------|----------|
| 6,014,458 | A  | * | 1/2000  | Wang               | 382/176  |
| 6,466,336 | B1 | * | 10/2002 | Sturgeon et al.    | 358/444  |
| 6,771,816 | B1 | * | 8/2004  | Gaither            | 382/176  |
| 2004/0103367 | A1 | * | 5/2004 | Riss et al.        | 715/506  |
| 2006/0190489 | A1 | * | 8/2006 | Vohariwatt et al.  | 707/104.1 |

* cited by examiner

*Primary Examiner*—Aaron W Carter  
(74) *Attorney, Agent, or Firm*—Procopio, Cory, Hargreaves & Savitch LLP

(57) ABSTRACT

The system and method facilitate the control and management of information and actions related to the computerized scanning, categorization, processing, storage, and retrieval of paper documents and electronic document images for the purposes of creating electronic data; data entry; data capture; data classification and categorization; and document-, file-, and records-management. The systems and methods facilitate the conversion of paper documents into electronic images and into more useful forms.

14 Claims, 19 Drawing Sheets

| Snippets 1 for All Documents | Snippets 2 for All Documents | Snippets 3 for All Documents | Snippets 4 for All Documents |
|---|---|---|---|
| May 19, 2005<br>Qty Item Price<br>3 Bolt $7.98<br>2 Screw $4.25 | William F Smith | Account:11180 | 5142-4938-8337-9110<br>Snippets for Document 1 |
| May 19, 2005<br>Qty Item Price<br>5 Washer $3.05<br>4 Gasket $8.33 | Robert Jones | Account:8060 | 2757-5979-1235-0677<br>Snippets for Document 2 |
| May 20, 2005<br>Qty Item Price<br>1 Bracket $9.98<br>4 Screw $2.25 | K C McCartney | Account:1522 | 9385-3487-2165-6709<br>Snippets for Document 3 |
| May 21, 2005<br>Qty Item Price<br>6 Clip $4.65<br>8 Marker $8.32 | Felix D Katt | Account:9666 | 9886-4654-4784-2573<br>Snippets for Document 4 |
| May 21, 2005<br>Qty Item Price<br>2 Rail $3.95<br>4 Holder $7.21 | Isis N Tobias | Account:2010 | 9643-4940-7658-2425<br>Snippets for Document 5 |
| May 22, 2005<br>Qty Item Price<br>1 Lock $9.98<br>2 Plate $8.66 | Alex Miranda | Account:11622 | 4968-4748-3522-5577<br>Snippets for Document 6 |

Figure 10B

SYSTEM AND METHOD FOR ELECTRONICALLY PROCESSING DOCUMENT IMAGES

RELATED APPLICATIONS

This application claims the benefit of the following provisional applications: Ser. No. 60/655,531, entitled A SYSTEM AND METHOD FOR FORM AND DOCUMENT VIEWING, and filed on Feb. 23, 2005; Ser. No. 60/684,866, entitled SYSTEM AND METHOD FOR DETECTING, VALIDATING AND IMPOSING CORRECT PAGE SEQUENCING IN ELECTRONIC DOCUMENTS, and filed on May 26, 2005; Ser. No. 60/688,969, entitled A SYSTEM AND METHOD FOR SECURELY TRANSCRIBING SENSITIVE OR CONFIDENTIAL DATA CONTAINED WITHIN SETS OF ELECTRONIC, SCANNED, DOCUMENT IMAGES, and filed Jun. 9, 2005; Ser. No. 60/708,263, entitled A COMPUTERIZED METHOD FOR INFORMATION STORAGE AND RETRIEVAL, and filed on Aug. 9, 2005, and Ser. No. 60/718,628, entitled A COMPUTERIZED SYSTEM AND METHOD FOR DOCUMENT SCANNING USING ONE-BUTTON CONTROLS, and filed Sep. 19, 2005 each of which is hereby incorporated by reference.

BACKGROUND

1. Field of the Invention

The present invention generally relates to the field of conversion of paper documents to electronic data.

2. Related Art

As the number of documents being digitally captured and distributed in electronic form increases, there is a growing need for techniques to quickly classify the purpose or intent of digitally captured documents, protect the security of the content of the documents, efficiently display the content of the documents to different users and allows users of such a system to monitor the process.

At one time document classification was done manually. An operator would visually scan and sort the documents by document type. This process was tedious, time consuming, and expensive. As computers have become more commonplace, the quantity of new documents including on-line publications has increased greatly and the number of electronic document databases has grown almost as quickly. As the number of documents being digitally captured and distributed in electronic form increases, the old, manual methods of classifying documents are simply no longer practical. Similarly, the conversion of the information in paper documents is an in efficient process which often involves data entry operators transcribing directly from original documents to create keyed data.

A great deal of work on document classification and analysis has been done in the areas of document management systems and document recognition. Specifically, the areas of page decomposition and optical character recognition (OCR) are well developed in the art. Page decomposition involves automatically recognizing the organization of an electronic document. This usually includes determining the size, location, and organization of distinct portions of an electronic document. For example, a particular page of an electronic document may include data of various types including paragraphs of text, graphics, and spreadsheet data. The page decomposition would typically be able to automatically determine the size and location of each particular portion (perhaps by indicating a perimeter), as well as the type of data found in each portion. Some-page decomposition software will go further than merely determining the type of data found in each portion, and will also determine format information within each portion. For example, the font, font size, and justification may be determined for a block containing text.

OCR involves converting a digital image of textual information into a form that can be processed as textual information. Since electronically captured documents are often simply optically scanned digital images of paper documents, page decomposition and OCR are often used together to gather information about the digital image and sometimes to create an electronic document that is easy to edit and manipulate with commonly available word processing and document publishing software. In addition, the textual information collected from the image through OCR is often used to allow documents to be searched based on their textual content.

There have also been a number of systems proposed which deal with classifying and extracting data from multiple document types, but many of these rely on some sort of identity string printed on the document itself. There are also systems available for automatically recognizing a candidate form as an instance of a specific form contained within a forms database based on the structure of lines on the form. These systems rely, however, on the fixed structure and scale of the documents involved. Finally, there are expert systems that have been designed using machine learning techniques to classify and extract data from diverse electronic documents. One such expert system is described in U.S. patent application Ser. No. 09/070,439 entitled "Automatic Extraction of Metadata Using a Neural Network, now U.S. Pat. No. 6,044,375." Machine learning techniques generally require a training phase which may demand a large amount of computational power. Therefore these classification systems may be made to operate much more efficiently to extract data from documents if the document type of a new document is known.

From the foregoing it will be apparent that there is still a need for a method to quickly and automatically compare a new document to a number of previously seen documents of known type to classify the new document as either belonging to a known type, or as belonging to a new type.

SUMMARY

The systems and methods described herein facilitate the control and management of information and actions related to the computerized scanning, categorization, processing, storage, and retrieval of paper documents and document images for the purposes of creating electronic data; data entry; data capture; data classification and categorization; and document-, file-, and records-management.

In one embodiment, the invention includes a computerized document processing system having an input document image processing module configured to receive a group of electronic images of documents, associate the group of electronic images of documents with a job type which includes one or more defined document types and one or more defined sequence of document images; identify the electronic images of documents as defined document types, and verify and correct defined sequences of document images. In a further embodiment, the system can further include a data entry module configured to receives the group of electronic images of documents from the document image processing module and configured to associate keyed data with the electronic image from which it was generated. The system can additionally include a document management module configured tracking the progress of the group of electronic images of documents through the system, provide access to the tracked progress, provide access to the group of electronic images of documents and its associated keyed data.

In another embodiment, the invention includes a method of processing images of documents. In one aspect, the method includes applying two or more masks to each document image to create two or more image work units of partitioned images ordered in the sequence of the document images. The method can additionally include reordering each image work unit to create reordered image work units in such a manner that the sequence of partitioned images in each reordered image work unit is different from all other reordered image work units and different from the sequence of the document images and to create a reference table which defines the reordering. The method can further include reordering the data in each data work unit using the information in the reference table and forming complete data records, from the reordered data work units, that match the sequence of document images.

Other embodiments are shown, described and claimed herein.

BRIEF DESCRIPTION OF THE DRAWINGS

The details of the present invention, both as to its structure and operation, may be gleaned in part by study of the accompanying drawings, in which like reference numerals refer to like parts. The drawings are not necessarily to scale, emphasis instead being placed upon illustrating the principles of the invention.

FIGS. 10A and 10B illustrate the partition generation process performed by the Partition (Snippet) Generator module.

DETAILED DESCRIPTION

The systems and methods described herein facilitate the control and management of information and actions related to the computerized scanning, categorization, processing, storage, and retrieval of paper documents and document images for the purposes of creating electronic data; data entry; data capture; data classification and categorization; and document-, file-, and records-management. The systems and methods described herein can facilitate the conversion of paper documents into electronic images and into more useful forms. The process can include automatic form identification; page identification; pre-OCR image enhancement; image compartmentalization; page sequence validation and correction; automatic document categorization and classification; and one-button manual document categorization and classification.

The systems and methods described herein can be implemented as a computer based system. Various elements and steps of the system and method can be implemented as and are described herein as being implemented with modules. The term "module" includes a software or hardware component which performs a function or certain tasks. A module may advantageously be configured to reside on an addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, variables, field programmable gate arrays (FPGA), and application specific integrated circuits (ASIC). The functionality provided for in the components and modules may be combined into fewer components and modules or further separated into additional components and modules.

Overview

Figure 1:
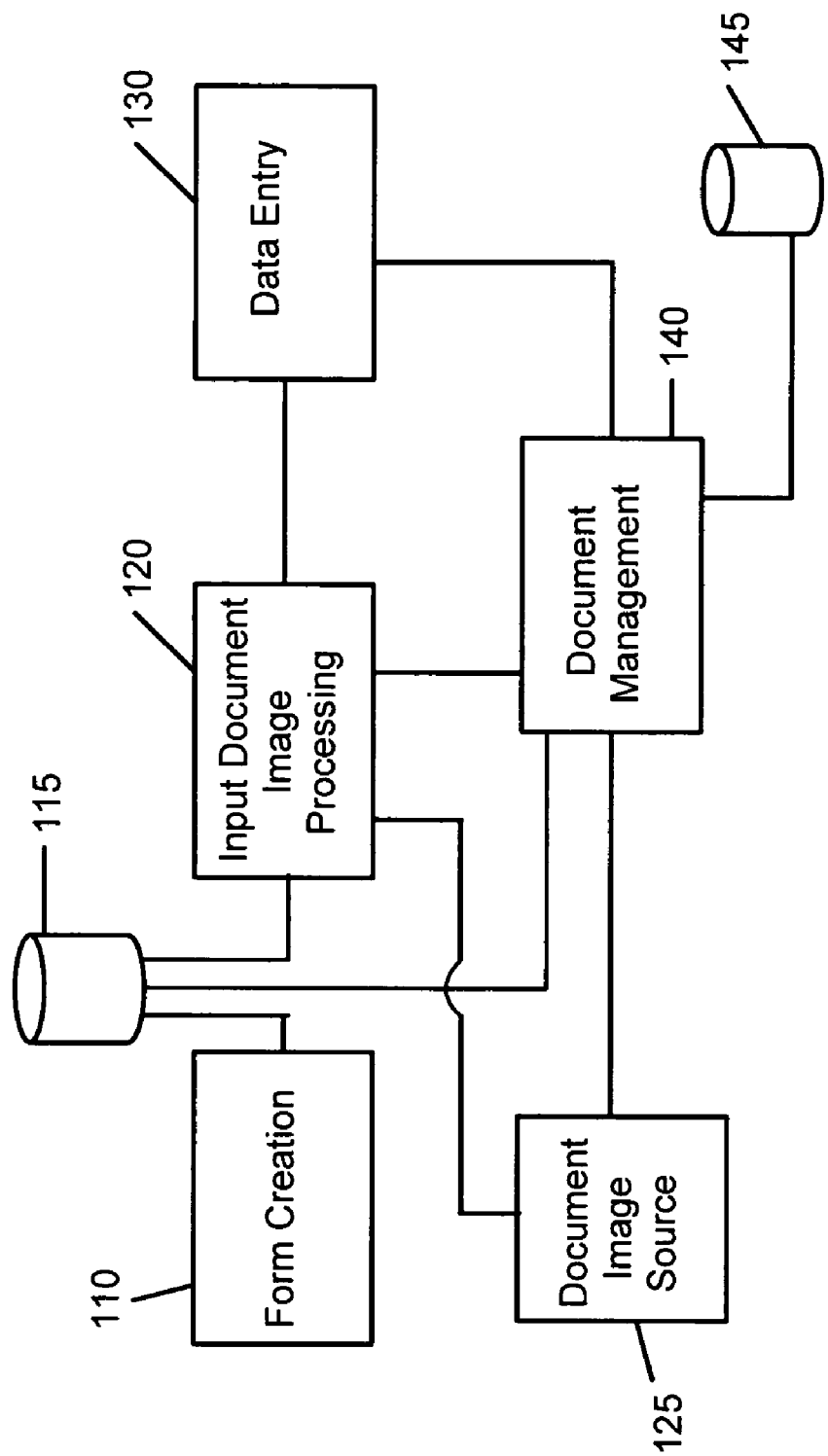
FIG. 1 is a high level functional block diagram of an embodiment of the system.

FIG. 1 is a high level functional block diagram of an embodiment of the system. The system includes a form creation module 110. The form creation module creates electronic forms for document types which can be utilized for the purposes of data entry, automatic form identification, compartmentalization, classification, and categorization. This can include the definition of fields in documents and the association of attributes with those fields. The form creation module can also be used to create page type definitions and page sequence definitions. All of this information can be stored in a form library database, for example, in a server or database 115.

The form definitions created by the form creation module 110 can be used by the input document image processing module 120 to process electronic images of documents with a group of images to be processed being referred to as a job. The electronic images of documents can be provided from a document image source 125 which can be a scanner, copier, fax machine or similar devices which create electronic images which can be transmitted over a network. The document image source can be a computer work station with an associated electronic document scanner. In one embodiment the provided job also includes a job type. Initially, all of the page images (or compartmentalized images) associated with a job are placed into a folder, for example, a Windows operating system folder, in a database. Each job has its own folder of page images.

The job type identifies the form definitions and other requirements to be used in processing the job. A job type can also include an identification of users that are permitted to use the job type or a definition or indication of a class of approved users. Having predefined job types allows a user to simply attach a previously defined set of classification and categorization criteria, processing instructions, and presentation attributes to a job. In one embodiment, a job type can be associated with a job through the activation of a single user interface button or similar simple interface. The image processing module 120 can recognize defined document types, verify and correct page sequences, divide the image into discrete sections and randomize the sections for security.

A relational database contains tables of information that describes jobs, users, companies, etc. Each job has one entry (one row) in a job table in the database. Typically, each customer of the system would have its own job table. The job table is initially populated by the input document image processing module 120 as each new job arrives. Fields in that row contain information about the job, for example, the name of the folder where the page images are stored, relational links to other tables that associate company, department, page definitions and processing instructions with the job. All of those other fields can be defined according to the job type.

The data entry module 130 receives the images and data from the document image processing module 120. The data entry module controls and facilitates the manual entry of data represented by the images of the documents which creates keyed data. It also can create complex linked data structures which link the keyed data with the corresponding defined fields and attributes and link the data to the corresponding document image.

The document management module 140 implements the tracking, management and reporting relating to the processing of the document images through the system. The document management module 140 implements file and record management utilizing a storage system such as a database or server 145. The document management module also provides the interface to the users.

Form Creation

Figure 2A:
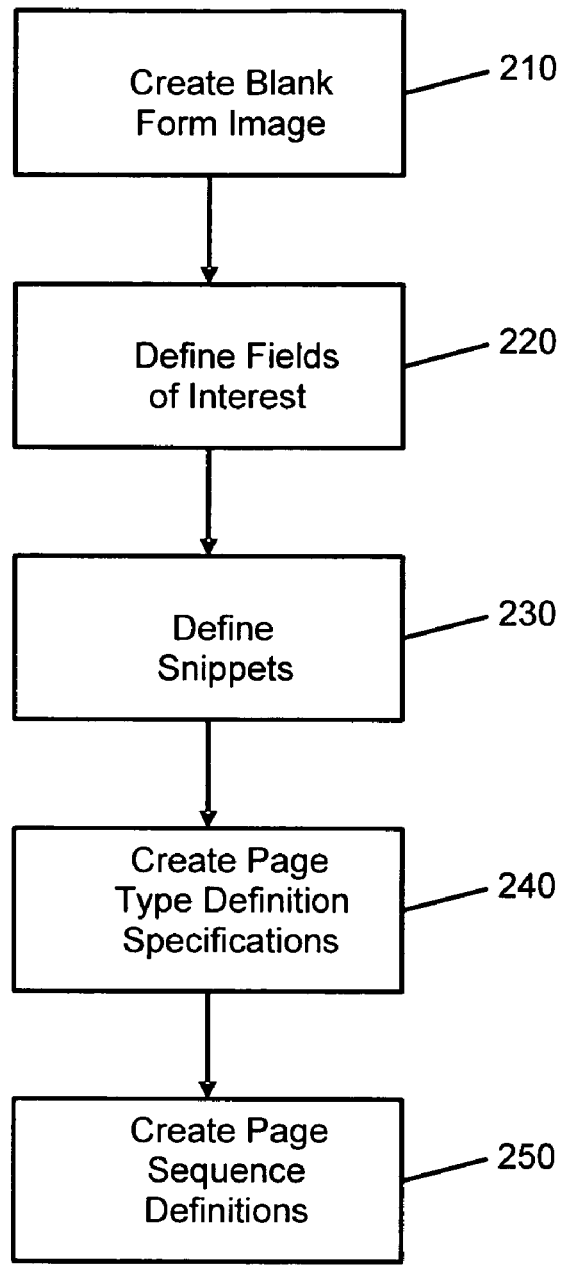
FIG. 2A is a flow chart of the steps or process performed by the form creation module.

Turning now to FIG. 2A, the operation of one embodiment of the form creation module will be described. FIG. 2A is a flow chart of the steps or process performed by the form creation module 110 of FIG. 1.

Figure 2B:
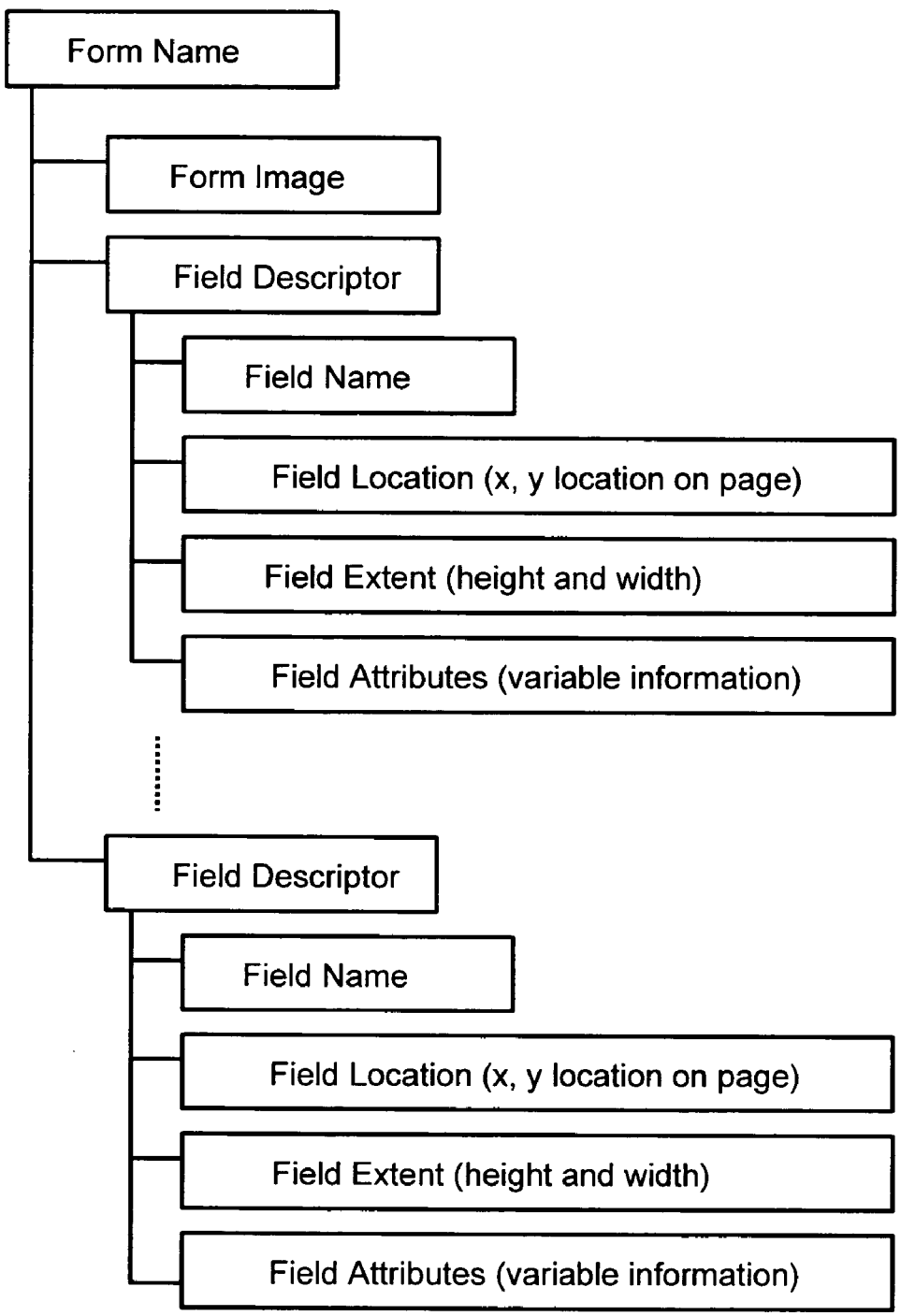
FIG. 2B is a representation of a data structure for a form.

In one embodiment a library of one or more document types or forms is created. FIG. 2B is a representation of a data structure for a form. The method depicted in FIG. 2A is one embodiment of a method that can be used to create a form. Starting at a step 210 a blank form image is created. The blank form image can be created, for example, by scanning a form in which no information has been entered (e.g., a blank credit card application). Each form image can be associated with a unique identifier (a name), which facilitates subsequent, on-demand retrieval of the form image from the Form Library Database which can be implemented in the database 115 shown in FIG. 1.

At a step 220 fields of interest in the form are defined. In one embodiment, a user retrieves the scanned, blank form from the Form Library Database and displays it on a local computer workstation (not shown). The user identifies the fields of interest, for example, by interactively highlighting them on the screen of the workstation, typically by drawing a rectangular border around each field using an interactive pointing device such as a computer mouse or light pen. In another embodiment, the user can identify fields of interest by highlighting them on a blank form using one or more colored, highlight markers, then scanning the highlighted form through a scanner which recognizes the colors of the markers. The use of different highlight colors can associate varying processing or field attributes with different fields on the form. Identifying a field creates a description of the location of the field on the page (e.g., x and y coordinates) the extent of the field (height and width). Once the fields are identified, the user assigns a unique name to each field, and associates attributes with each field. The attributes associated with a field can include, for example, an access restriction code (available to all users, restricted to managers, highly confidential, etc.), a definition of the type of data expected in the field (e.g., numeric, names, social security number, address), etc. This information is stored in the Form Library Database associated with the unique identifier of the form.

At a step 230 snippets for the form can be defined. In general, the ability to define and create snippets for documents allows for the images and data (content) associated with the snippets to be treated and processed in different ways for the same document. For example, this allows for social security numbers to processed separately from the names associated with those social security numbers to reduce the possibility of identity theft. The form creation module allows the user to retrieve the scanned, blank form and display it on a local computer workstation. The user can identify the fields of interest for snippets by, for example, interactively highlighting them on the screen of the workstation, for example, by drawing a rectangular border around each field using an interactive pointing device such as a computer mouse or light pen. Alternatively, this process can be combined with defining fields of interest in step 220 or can use the definitions created in step 220. Once the fields are identified, the Form Generator module allows the user to define a Partition Definition Specification for each field. For example, the attributes can define which fields must be partitioned from other fields for security as will be described more fully below. In one embodiment, the partition definition specification defines an associated mask for each field. The mask blocks out the portions of the form that are to be separated from the field, for example, during keying or data entry.

At a step 240, page type definition specifications are created for the form. The page type definitions can include attributes of the form, such as the locations and patterns of text strings, which serve to provide unique identifying characteristics for each type of page for the form. In one embodiment, this specification serves to define triggers (the content and location of text strings on the page) and page types (which associate one or more triggers with page types). The page type definition specification can be entered into the system in any of several different ways including, but not limited to, a mouse or other interactive pointing device operating by a user at a computer work station or a file of text. A more detailed description of the information which can be used to perform page type identification and an example method of specifying a page type definition specification are provided below At a step 250, a page sequence definition is created for the form. In one embodiment, the definition is created by the user interacting with the system, for example, via a computer work station, to create one or more page sequence definitions. These definitions serve to define valid sequences of page types by means of a regular expression as was described above. The page sequence definition specification can be entered into the system in any of several different ways including, but not limited to, a mouse or other interactive pointing device or a file of text. A more detailed description of the information to perform page sequencing is provided below.

The foregoing process can be repeated for any form the system may process. Not all forms will require the creation of each type of definition.

Input Document Image Processing—Page Type and Sequence

Figure 3:
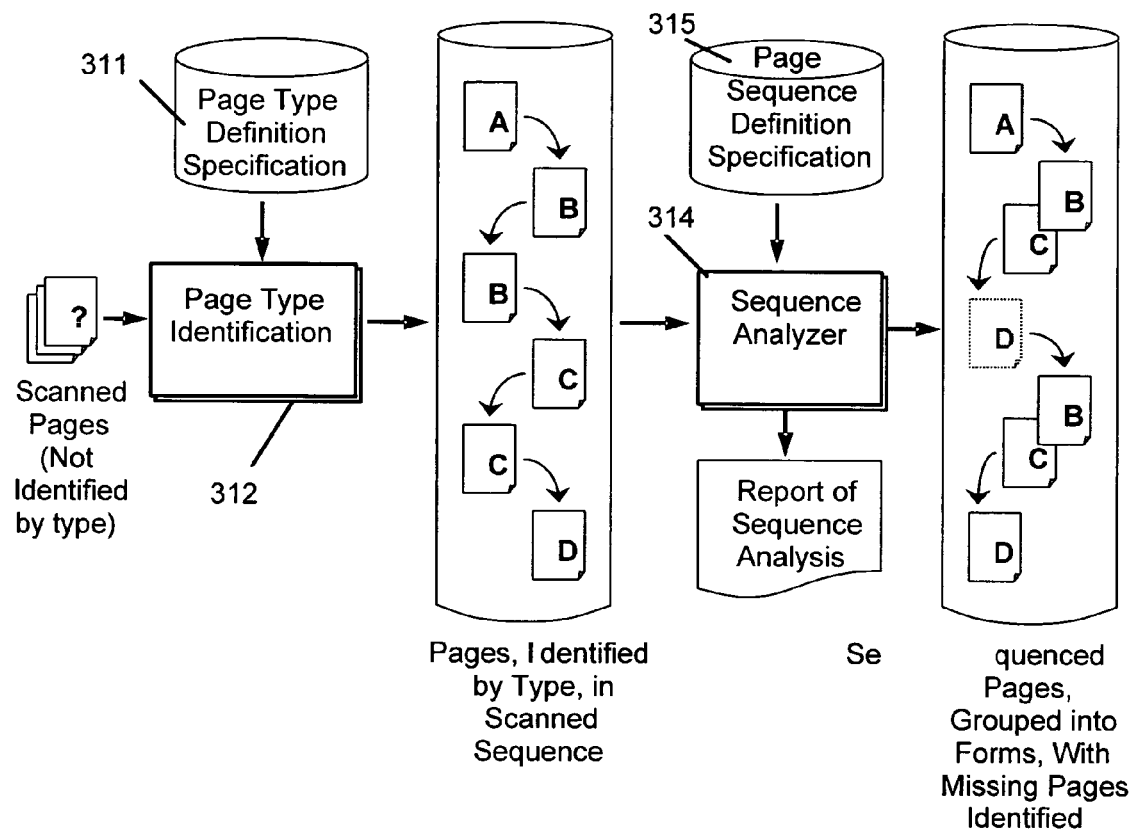
FIG. 3 is a schematic representation of one aspect of the operation of the input document image processing module.

FIG. 3 is a schematic representation of one aspect of the operation of the input document image processing module 120. An embodiment of the system includes a page type identification module 312. The page type identification module analyzes a sequence of page images (interchangeably referred to as pages) using one or more specifications obtained from a page type definition file 311 which can be a component of the Form Library Database referred to above. In one embodiment, the page specification(s) is identified by the job type associated with the job. The page type definitions can include attributes such as the locations and patterns of text strings, which serve to provide identifying characteristics for each type of page that is expected. The page images can be obtained from a scanner or can be electronically generated. Once identified by type, each page is then stored along with its associated page type in the sequence in which it was received or originally scanned or with information which identifies that sequence. If a page does not match any of the page type definitions, a signal is generated indicating that an exception has occurred. The system can continue processing the document with the unidentified page type or the processing can be halted until an operator intervenes.

After each page has been identified by type by the page type identification module 312, a sequence analyzer module 314 processes groups of scanned pages by analyzing the page type associated with each page and performing an inter-page page type relationship analysis. Using one or more specifications obtained from a page sequence definition file 315, the sequence analyzer 314 analyzes the scanned page types in the sequence in which the associated pages were originally scanned (or received) to determine if the pages are ordered in a valid sequence. The page sequence definition file 315 can be a component of the Form Library Database referred to above. In one embodiment, the page sequence specification is identified by the job type associated with the job.

If the original page sequence is not valid, the sequence analyzer determines if the page sequence can be made valid by the insertion, removal, or re-sequencing (or a combination thereof) of page types. Based upon an analysis of a parse tree, the sequence analyzer makes the fewest number of changes to the original page sequence in order to produce a valid page sequence. All suggested modifications to the page sequence are reported and the re-sequenced pages are stored. As part of its operation, the sequence analyzer partitions and groups pages into forms and document packages, based upon the page sequence definition specification.

The operation and function of the page type identification module 312 will now be described in more detail. In general, the function of the page type identification module 312 is to classify a page image by page type. The classification is performed by comparing the contents and format of scanned page images against a set of identifying characteristics for each pre-defined page type. In one embodiment, as each identifying characteristic of a page type is compared against a page's contents and format, a flag (referred to as a "trigger") is set to either a PASS or FAIL conditional status. When all of the triggers for a page have been set to a conditional status, the states of the triggers are compared to the defined trigger states that are unique to each supported page type. The result of the comparisons is used to assign a page type to the scanned page.

Figure 4:
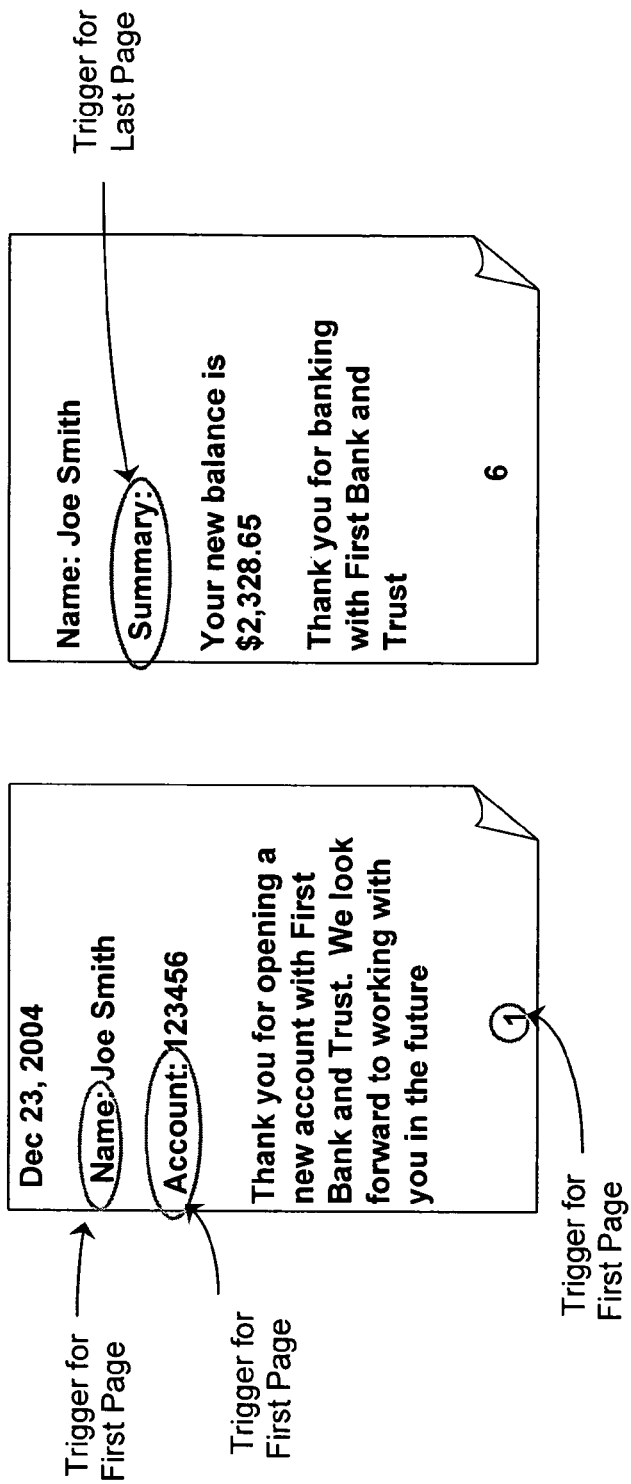
FIG. 4 is an illustration of two page images with triggers indicated which can be used to identify the first page and the last page of a bank statement.

FIG. 4 is an illustration of two page images with triggers indicated which can be used to identify the first page and the last page of a bank statement. In this example, triggers are defined to test the presence of the strings "Name:", "Account:", "1", and "Summary" on a page image. Note that more than one trigger might have to be satisfied in order to uniquely identify a page. For example, the string "Name:" appears on both pages illustrated in FIG. 4 and, therefore, does not serve by itself to uniquely identify a page.

Figure 5:
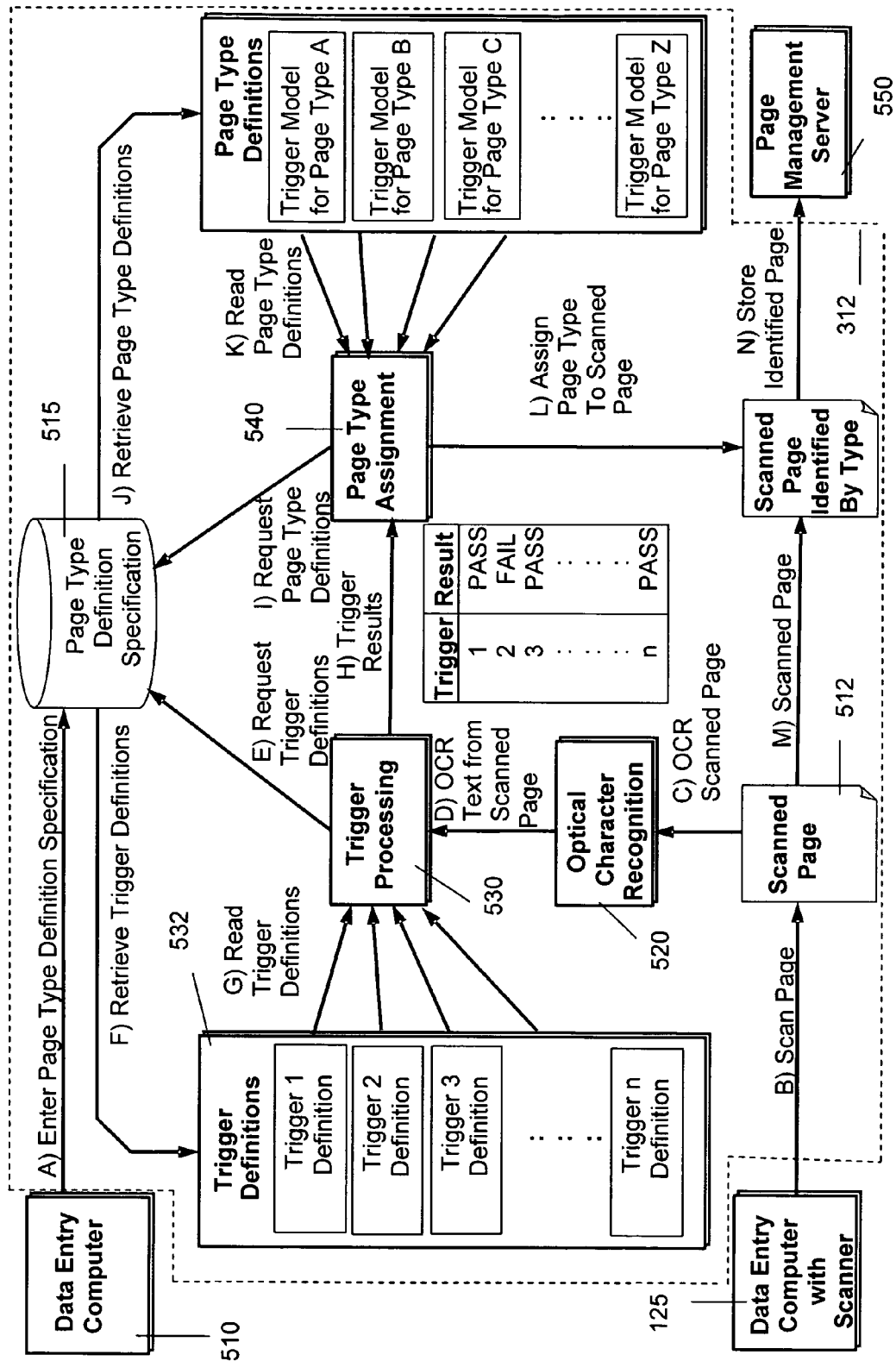
FIG. 5 is a block diagram which illustrates the functional components and operation (the lettered steps) of one embodiment of the page type identification module 312 of FIG. 3.

FIG. 5 is a block diagram which illustrates the functional components and operation (the lettered steps) of one embodiment of the page type identification module 312 of FIG. 3. Steps or functions implemented by the page type identification module 312 are identified by letter above the flow lines in the figure.

The process starts at step A with a user interacting with the page type identification module 312, for example, via a computer work station 510, to create one or more page type definition specifications 515 which can be a component of the Form Library Database referred to above. The process of creating one or more page type definition specifications can be part of the form creation process implemented by form creation module 110 or can be a separate process. A page type specification can be associated with a document type. The page type definition specification includes one or more trigger definitions (for example, the content and location of text strings on the page) and one or more page types (which associate one or more triggers with page types). The page type definition specification can be entered into the system in any of several different ways including, but not limited to, a mouse or other interactive pointing device or a file of text. A more detailed description of the information to perform page type identification and one example method of specifying a page type definition specification are presented below.

At step B one or more images of pages 512 (referred to as pages) to be classified by page type are received by the page type identification module 312 from a document image source 125. The pages can be scanned images of paper of documents, keyed text, clip art or other graphics, and programmatically generated content. An identification of the document type can also be received. The document type can be used to identify the list of potential page types rather than using all possible page types and all possible trigger definitions.

At step C the optical character recognition (OCR) module 520 processes each of the received pages to convert the page image into text and to record the coordinates of each string of text on the page. Various types of commercially available OCR software can be used to perform this function. This step is not needed for pages without text.

At step D the converted text from the OCR module 520 is presented to the trigger processing module 530. At steps E, F, and G the trigger processing module requests and receives the set of trigger definitions 532 from the page type definition specification 515. When a document type has been provided to the page type identification module 312, the trigger processing module can limit the requested trigger definitions to those associated with page types associated with the document type.

For each page that is analyzed, the trigger processing module 530 initially sets the results associated with each trigger definition to FAIL. For each trigger definition, the trigger processing module searches the recognized text from the scanned page for a match. If matching text is found, the trigger processing program sets the corresponding trigger results to PASS. When all trigger definitions have been tested against all strings of text on the page, the trigger processing program passes the results of all the triggers to the page type assignment program 540 (step H).

At step I, upon receipt of the trigger results or at an earlier time, the page type assignment module 540 requests the set of page type definitions from the page type definition specification 515. When a document type has been provided to the page type identification module 312, the page type assignment module can limit the requested page type definitions to those associated with the document type. At step J, the page type definitions are retrieved from the page type definition specification. At step K the page type assignment program module reads the page type definitions, which consist of trigger models for each page type in the definition.

The page type assignment module 540 processes the trigger results obtained from the trigger processing module against the trigger models contained within the page type definitions. When trigger results for a page match one of the trigger models, the page type for that page is determined. As represented by steps L and M, the determined or assigned page type is then associated with the corresponding page image. In step N, the scanned page image and its associated page type identification are then stored, for example, to a page management server 550.

At the completion of the above process, the page management server 550 contains the original scanned images, in their original scanned sequence, identified and classified by page type. With the individual pages identified by type, more sophisticated processing, such as missing page detection and page re-sequencing can be performed.

Page Type Definition Specification

The command content and syntax described in this section is an embodiment of the information and structure which can be utilized by the page type identification module 312 to perform an automatic identification and assignment of page type to a scanned page image of unknown type. The command content and syntax can be implemented in the page type identification module 312 to implement the functions and process described above in connection with FIG. 5. Two commands, with optional parameters, are defined. The <!TRIGGER> command is used to define pattern matching triggers that are used by the trigger processing module 530 described above. The <!PAGE> command is used to define the trigger models used by the page type assignment module 540 to assign a page type based upon the results of the trigger processing module. In the following command descriptions, literal text is presented in BOLD CAPITALS. Variable data is presented in un-bolded italics. Optional information is presented [in brackets]. Alternative selections are indicated by separating the selections with a vertical bar "|".

The syntax of the <!TRIGGER> command is:

<!TRIGGER trigger_name trigger_definition> where trigger_name is a unique, user-defined, alphanumeric name for the trigger being defined, and trigger_definition is a concatenation of one or more trigger definition clauses. Valid trigger definition clauses, which typically consist of a single keyword or a keyword followed by an equal sign and one or more parameters, include:

HLOCATION=([xmin], [xmax][, trigger_name])

where xmin and xmax specify the horizontal limits on the page where a matching text pattern must start. If xmin is not specified, zero is assumed. If xmax is not specified, the right boundary is unlimited. If a third parameter, a trigger name, is specified, the horizontal limits are specified relative to the location of a text string that matches another, named, <!TRIGGER> command. If an HLOCATION clause is not specified, the entire width of the page is assumed.

VLOCATION=([ymin], [ymax][, trigger_name])

where ymin and ymax specify the vertical limits on the page where a matching text pattern must start. If ymin is not specified, zero is assumed. If ymax is not specified, the bottom boundary is unlimited. If a third parameter, a trigger_name, is specified, the vertical limits are specified relative to the location of a text string that matches another, named, <!TRIGGER> command. If a VLOCATION clause is not specified, the entire depth of the page is assumed.

Taken together, the HLOCATION and VLOCATION clauses define a rectangular area on the page in which a matching string of text must start in order for the <!TRIGGER> command to pass.

MATCH="pattern"

where pattern specifies a string of text in the form of an extended regular expression (see below). The quotation marks around pattern are required. In order for the <!TRIGGER> command to pass, a string of text on the scanned page must match the pattern, subject to any additional constraints imposed by other trigger definition clauses in the command.

EXCLUDE="pattern" |([ALPHA], [NUMERICS], [PUNCTUATION])

where pattern specifies a string of text in the form of an extended regular expression. The quotation marks around pattern are required. Additionally, instead of a pattern, the keywords ALPHA, NUMERICS, and PUNCTUATION may be specified in any combination, separated by commas. The EXCLUDE clause causes text characters on the scanned page to be removed before the text string is matched against the pattern specified in a MATCH clause.

SINGLEBLANK|NOBLANKS

The SINGLEBLANK clause causes multiple, concatenated blank characters in the text from the scanned page to be replaced by a single blank character before the string is matched against a MATCH pattern. The NOBLANKS clause causes all blank characters in the text from the scanned page to be removed before the string is matched against a MATCH pattern.

UPPERCASE|LOWERCASE

The UPPERCASE clause causes all characters in the text from the page to be converted to upper case before they are matched against a MATCH pattern. The LOWERCASE clause causes all characters in the text from the page to be converted to lower case before they are matched against a MATCH pattern.

As described above, the MATCH and EXCLUDE clauses take a pattern as a specification. Patterns are specified using an extended regular expression syntax, which is defined as follows:

| Pattern | Pattern Description | Matches (in the target string) |
|---|---|---|
| x | Any literal, displayable character, including blank, except for a meta-character: \ . % $ [ ] ( ) { } ! * + ? \| ~ - " | A single instance of itself |
| \x | A backslash followed immediately by any literal, displayable character, including blank and including meta-characters | A single instance of itself without the backslash (used to match a character in the target string that would otherwise be regarded as a meta-character) |
| . | A dot or period | A single instance of any displayable character, including blank and meta- |

-continued

| Pattern | Pattern Description | Matches (in the target string) |
|---|---|---|
| | | characters (used to perform a single-character wildcard match) |
| % | A percent sign at the start of the pattern | The beginning of the target string |
| $ | A dollar sign at the end of the pattern | The end of the target string |
| [abcde] | One or more literal, displayable characters (of the form x or \x) enclosed within brackets | A single instance of any character contained within the brackets |
| [!abcde] | One or more literal, displayable characters (of the form x or \x) preceded by an exclamation point and enclosed within brackets | A single instance of any character not contained within the brackets |
| [a-z] | Two literal, displayable characters separated by a dash and enclosed within brackets | A single instance of any character in the inclusive range specified by the pattern, according to the ASCII collating sequence |
| ~A | A tilde followed by an upper case letter "A" | A single instance of any upper case letter (equivalent to [A-Z]) |
| ~a | A tilde followed by a lower case letter "a" | A single instance of any lower case letter (equivalent to [a-z]) |
| ~9 | A tilde followed by the numeral "9" | A single instance of any numeric character (equivalent to [0-9]) |
| patternpattern | Two (or more) concatenated patterns | The consecutive characters in the pattern |
| pattern\pattern | Two (or more) patterns, each separated by a vertical bar | A single instance of exactly one of the patterns |
| (pattern) | A pattern enclosed within parenthesis | Used to group patterns in complex pattern expressions |
| pattern? | A pattern followed by a question mark | Zero or one instance of the pattern |
| pattern+ | A pattern followed by a plus sign | One or more consecutive instances of the pattern |
| pattern* | A pattern followed by an asterisk | Zero or more consecutive instances of the pattern |
| pattern{n} | A pattern followed by an integer enclosed within braces | Exactly n consecutive instances of the pattern |
| pattern{m-n} | A pattern followed by two integers, separated by a dash, enclosed within braces | Between m and n (inclusive) consecutive instances of the pattern |
| pattern{n+} | A pattern followed by an integer and a plus sign, enclosed within braces | n or more consecutive instances of the pattern |

Examples of the use of the pattern syntax follow:

1) A Social Security Account Number, which consists of 3 digits, a dash, 2 digits, a dash, and 4 digits can be represented by any of the following patterns:

[0-9][0-9][0-9]\-[0-9][0-9]\-[0-9][0-9][0-9][0-9]
[0-9] {3}\-[0-9] {2}\-[0-9] {4}
~9~9~9\-~9~9\-~9~9~9~9
~9{3}\-~9{2}\-~9{4}

2) The title "Mr", "Mrs", or "Ms" can be represented by any of the following patterns:
(Mr)|(Mrs)|(Ms)
M(r|(rs)|s)
M((rs?)|s)

Examples of the use of the <!TRIGGER> command follow:

1) Define a trigger that detects the presence of the first page of a multi-page document. The first page is indicated by the page number "1" appearing on the bottom one-half inch of the page:
   <!TRIGGER page1 VLOCATION=(10.5,11) NOBLANKS MATCH="%1$">

2) Define a trigger that detects the presence of a telephone number of the form (nnn) nnn-nnnn anywhere on the page:
   <!TRIGGER phone NOBLANKS MATCH=
     "\(~9{3}\)~9{3}\-~9{4}">

Once the <!TRIGGER> command has been used to define pattern matching triggers for detecting specified strings of text on a page, the <!PAGE> command is used to define the trigger models needed by the page type assignment program to assign a page type based upon the results of the trigger processing program. In the following command descriptions, literal text is presented in BOLD CAPITALS. Variable data is presented in unbolded italics. Optional information is presented [in brackets]. Alternative selections are indicated by separating the selections with a vertical bar "|".

The syntax of the <!PAGE> command is:
   <!PAGE page_name (trigger_model)> where page_name is a unique, user-defined, alphanumeric name for the page being defined, and trigger_model is a logical expression that refers to one or more trigger_names (from <!TRIGGER> command definitions) and which evaluates to either PASS or FAIL. The trigger_model can take the following forms, recursively:

(trigger_model)

The parentheses are used to group trigger models into complex expressions and results in an identity operation being performed upon the trigger_model inside the parentheses. Thus,

| trigger_model | (trigger_model) |
|---|---|
| PASS | PASS |
| FAIL | FAIL |

!trigger_model

An exclamation point placed in front of a trigger_model results in the negation of the trigger_model following the exclamation point. Thus,

| trigger_model | !trigger_model |
|---|---|
| PASS | FAIL |
| FAIL | PASS | trigger_model+trigger_model

A plus sign placed between two trigger_models results in a logical AND of the values of the two trigger_models. Thus,

| trigger_model_1 | trigger_model_2 | trigger_model_1 + trigger_model_2 |
|---|---|---|
| PASS | PASS | PASS |
| PASS | FAIL | FAIL |
| FAIL | PASS | FAIL |
| FAIL | FAIL | FAIL | trigger_model|trigger_model

A vertical bar placed between two trigger_models results in a logical OR of the values of the two trigger_models. Thus,

| trigger_model_1 | trigger_model_2 | trigger_model_1 \| trigger_model_2 |
|---|---|---|
| PASS | PASS | PASS |
| PASS | FAIL | PASS |
| FAIL | PASS | PASS |
| FAIL | FAIL | FAIL | trigger_model:trigger_model

A colon placed between two trigger_models results in a logical EXCLUSIVE OR of the values of the two trigger_models. Thus,

| trigger_model_1 | trigger_model_2 | trigger_model_1 : trigger_model_2 |
|---|---|---|
| PASS | PASS | FAIL |
| PASS | FAIL | PASS |
| FAIL | PASS | PASS |
| FAIL | FAIL | FAIL | trigger_name

Specifying a trigger_name for a trigger_model links the <!PAGE> command to a <!TRIGGER> command and results in an identity operation being performed upon the trigger_name. Thus,

| trigger_name | trigger_model |
|---|---|
| PASS | PASS |
| FAIL | FAIL |

The purpose of the sequence analyzer module 314 (see FIG. 3) is to examine a sequence of pages that have been identified by type and determine 1) if the pages are in a valid sequence; and, 2) if any pages are missing from the sequence. The determination can be performed by comparing the types of pages in the actual sequence of the scanned page images against a description of the valid sequences as represented by a finite state automaton, which is a manifestation of a regular expression. As the sequence of page type identifiers is parsed by the finite state automaton, the state transitions indicate whether the sequence is valid. By making a modification to the regular expression, a second finite state automaton can be constructed that can be used to identify missing pages in an otherwise correctly sequenced set of page images.

Figure 6:
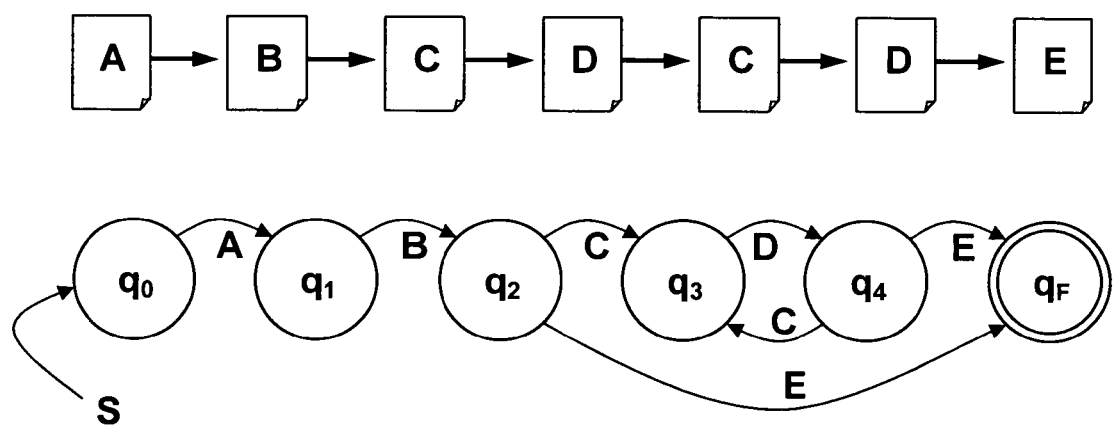
FIG. 6 illustrates an example of a sequence of page images that have been identified by type and an associated finite state automaton.

FIG. 6 illustrates an example of a sequence of page images that have been identified by type and an associated finite state automaton. For ease of explanation, in this example, the page type identifiers are given as single characters. The regular expression corresponding to the finite state automaton shown in FIG. 6 is A B (C D)* E. The regular expression, and the corresponding automaton, specifies a sequence of pages that consists of exactly one instance of page type A, followed by exactly one instance of page type B, followed by any number (including zero) instances of pairs of page types C and D, followed by exactly one instance of page type E. The finite state automaton is an instantiation of the regular expression.

Figure 7:
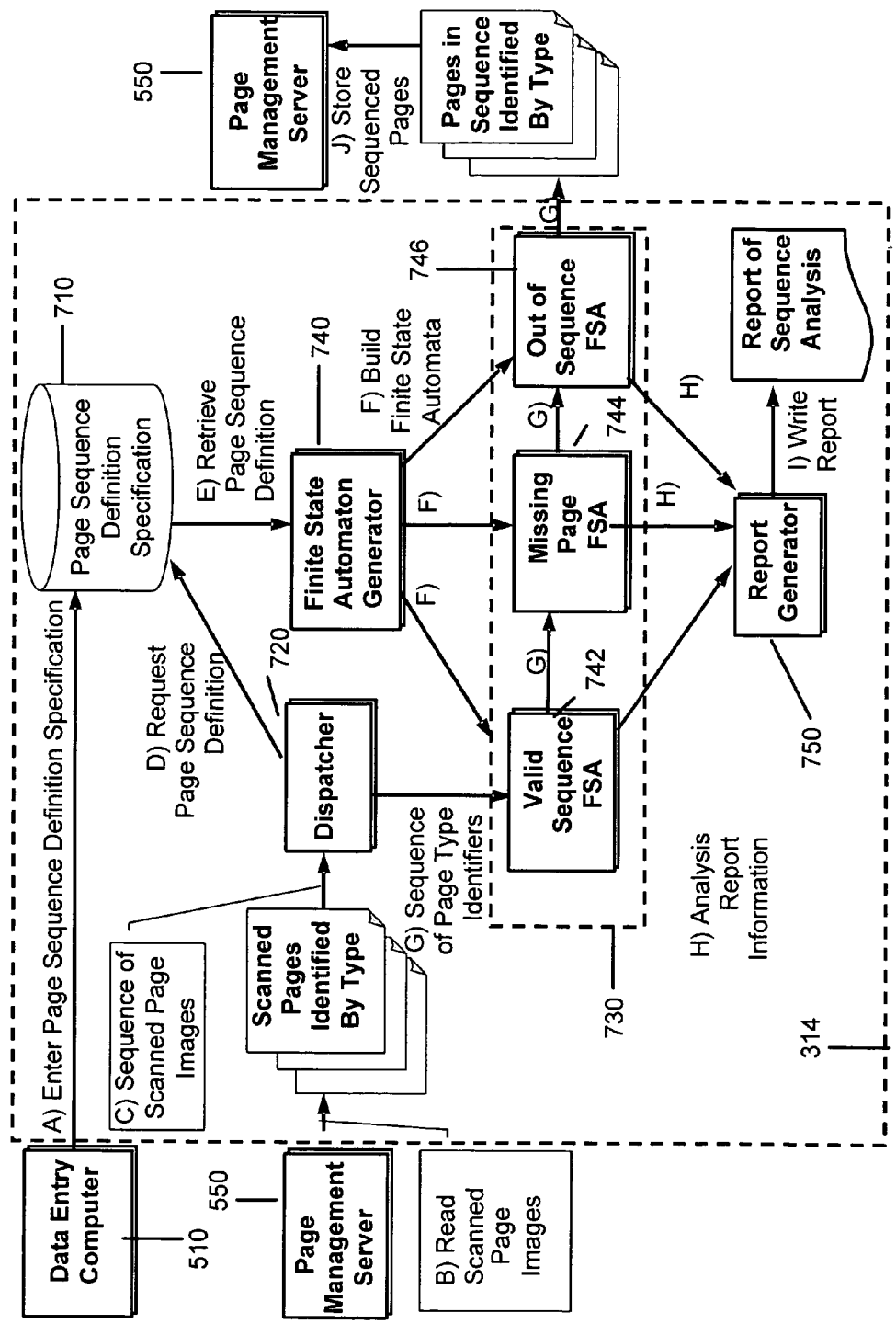
FIG. 7 is a block diagram which illustrates the functional components and operation (the lettered steps) of one embodiment of the sequence analyzer module.

Referring now to FIG. 7, the basic operation (the lettered steps) of the sequence analyzer module will be described. FIG. 7 is a block diagram which illustrates the functional components and operation (the lettered steps) of one embodiment of the sequence analyzer module 314 of FIG. 3. Steps or functions implemented by the module 314 are identified by letter above the flow lines in the figure.

The sequence analyzer module functions to examine a sequence of pages that have been identified by type and determine 1) if the pages are in a valid sequence; and, 2) if any pages are missing from the sequence. The process starts (step A) with the user interacting with the sequence analyzer module 312, for example, via a computer work station 510, to create one or more page sequence definitions which can be stored in a page sequence definition specification database 710 which can be a component of the Form Library Database referred to above. This specification serves to define valid sequences of page types by means of a regular expression as was described above. The page sequence definition specification can be entered into the system in any of several different ways including, but not limited to, a mouse or other interactive pointing device or a file of text. A more detailed description of the information to perform page sequencing is described below.

At step B a sequence of page images along with their previously assigned types, whose sequencing validity is to be determined, is read from the page management server 550. At step C, the sequence of page images and their previously assigned types is presented to a dispatcher module which has the function of controlling the generation of finite state automatons (FSA) from the Page Sequence Definition Specification and to present the candidate sequence of page images/types to the resultant finite state automatons 730.

At step D the dispatcher module 720 requests the page sequence definition from the page sequence definition specification database 710. At step E the page sequence definition is retrieved from the page sequence definition specification and is presented to the finite state automaton generator 740.

At step F, using the regular expressions contained within the page sequence definition, the finite state automaton generator 740 builds three finite state automata (742, 744, 746). The first automaton 742 is an instantiation of the regular expression into a process that can determine if the sequence of page types is complete and properly sequenced. The second automaton 744 is an instantiation of the regular expression into a process that can determine and identify if one or more page types are missing from the otherwise correctly ordered sequence of page types. The third automaton 746 is an instantiation of the regular expression into a process that can determine if all necessary page types are present, but improperly sequenced.

When the finite state automaton generator has finished building the finite state automata 730, the dispatcher presents the three automata with the sequence of page types in the order in which they were scanned as part of step G. Also as part of step G, using processes or algorithms described in more detail below, the automata:

a. determine if the sequence of page types is complete and properly sequenced;
b. determine and identify if one or more page types are missing from the otherwise correctly ordered sequence of page types;
c. determine if all necessary page types are present, but improperly sequenced and determine the correct sequence; and
d. output a properly sequenced sequence of pages identified by page type.

At step H, if any errors or inconsistencies are determined by any of the finite state automata, they generate report information on the errors or inconsistencies, which is passed to the report generator module 750. At step I, the report generator 750 produces an electronic report of the actions taken by the sequence analyzer and any errors and inconsistencies.

At step J, the correct sequence of pages is written to the page management server 550 for subsequent processing. This can be done through a data structure which correlates the correct order with each page image or an actual re-ordered file of the images. Therefore, at the completion of the above process, the page management server 550 can contain the original scanned images, in a valid sequence, with placeholders for missing pages. Using the report of the sequence analysis, manual action can be taken to verify the corrective actions taken by the sequence analyzer and/or human intervention can provide further corrective action.

Page Sequence Definition Specification

The command content and syntax presented in this section is an embodiment of the information and structure which can be implemented by the sequence analyzer module 314 to perform an automatic page sequence analysis upon a candidate set of page images that have been previously identified by page type. Two commands, with options, are defined. The <!FORM> command is used to specify a regular expression that describes the valid sequence of page images in a form. (A form is defined as one or more pages that are closely related to each other by means of content, topic, or identical form number.) The <!PACKAGE> command is used to specify a regular expression that describes the valid sequence of forms and pages in a package. (A package is defined as one or more pages and/or forms that are closely related to each other by some identifying value or values. For example, a tax package consists of one or more pages and single- or multi-page forms that apply to an individual person.)

In the following command descriptions, literal text is presented in BOLD CAPITALS. Variable data is presented in un-bolded italics. Optional information is presented [in brackets]. Alternative selections are indicated by separating the selections with a vertical bar |.

The syntax of the <!FORM> and <!PACKAGE> commands is:

<!FORM form_name (content_model)>
<!PACKAGE package_name (content_model)> where form_name and package_name are unique, user-defined, alphanumeric names for the form or package being defined, and content_model is an extended regular expression that defines the valid sequences of pages and forms in a form or package. Note: The content_model must be enclosed within parentheses.

A content_model is defined recursively as: If $cm_1, cm_2, \ldots, cm_n$ are content_models, then the following expressions are content_models:

| Content Model | Content Model Description | Content Model Meaning |
|---|---|---|
| page_name | Any page name from a <!PAGE> command | A single occurrence of a page previously identified as type page_name |
| form_name | Any form name from a <!FORM> command | A single occurrence of a form (which may consist of one or more pages) previously identified as type form_name |
| $(cm_1)$ | A content model enclosed within parenthesis | Used to group content models in complex expressions |
| $cm_1, cm_2$ | Two (or more) content models separated by comma(s) | A single occurrence of the first content model immediately followed by a single occurrence of the second content model, in the exact order specified |
| $cm_1 \& cm_2$ | Two (or more) content models separated by ampersand(s) | A single occurrence of each of the content models, in any order |
| $cm_1 \mid cm_2$ | Two (or more) content models, separated by vertical bar(s) | A single instance of exactly one of the content models |
| $cm_1?$ | A content model followed by a question mark | Zero or one occurrence of the content model |
| $cm_1+$ | A content model followed by a plus sign | One or more consecutive occurrences of the content model |
| $cm_1*$ | A content model followed by an asterisk | Zero or more consecutive occurrences of the content model |

Examples of the use of the <!FORM> and <!PACKAGE> commands follow:

1) Define a form that consists of a single instance of three previously-identified, uniquely-named pages, in order, followed by at least one instance of a fourth, previously-identified page, followed by a single instance of a fifth uniquely-named page:

<!FORM credit_applic (p1, p2, p3, (p4)+, p5)>

2) Define a tax package that consists of mandatory, single copies of forms 1040 (a 2-page form), Schedule A (a 1-page form), and Schedule B (a 1-page form); an optional, single copy of Schedule D (a 3-page form with the middle page optional), and zero or more copies of Schedule E (a 4-page form with the last three pages optional):

<!FORM f1040 (f1040pg1, f1040pg2)>
<!FORM skedD (Dpg1, Dpg2?, Dpg3)>
<!FORM skedE (Epg1, Epg2?, Epg3?, Epg4?)>
<!PACKAGE tax (f1040, skedA, skedB, skedD?, skedE*)>

Construction of Finite State Automata

In one embodiment the sequence analyzer module 314 relies upon the known properties of formal language theory that a finite state automaton can be constructed from any regular expression, and that a regular grammar can be constructed from any regular expression. In fact, given any one of the three representations of a regular language—regular expression, regular grammar, and finite state automaton—the other two representations can be easily derived.

The sequence analyzer constructs three finite automata, which are derived from the content models specified in the <!FORM> and <!PACKAGE> commands that are contained in the page sequence definition specification. These three finite state automata (FSA) FSA 742, FSA 744 and FSA 746 of FIG. 7:

FSA 1: Determine if a supplied sequence of page_names and form_names are a valid sequence within a <!FORM> or <!PACKAGE> content model;

FSA 2: Determine if one or more page_names and/or form_names are missing from a supplied sequence of page_names and form_names that is otherwise a valid sequence within a <!FORM> or <!PACKAGE> content model;

FSA 3: Determine if all necessary page types are present according to the content model specified within a <!FORM> or <!PACKAGE> command, but the page_names and form_names are improperly sequenced.

The proof of FSA 1, that an FSA can be constructed from the !FORM/!PACKAGE content model, simply requires mapping the syntax of the !FORM/!PACKAGE content model onto regular expression syntax:

| Content Model | Regular Expression Equivalent |
|---|---|
| page_name | page_name |
| form_name | form_name |
| $(cm_1)$ | $(cm_1)$ |
| $cm_1, cm_2$ | $cm_1 \cdot cm_2$ |
| $cm_1 \& cm_2$ | $(cm_1 \cdot cm_2) \mid (cm_2 \cdot cm_1)$ |
| $cm_1 \mid cm_2$ | $cm_1 \mid cm_2$ |
| $cm_1?$ | $(cm_1 \mid \lambda)$ |
| $cm_1+$ | $cm_1 \cdot cm_1^*$ |
| $cm_1^*$ | $cm_1^*$ |

In the table above, the symbol $\lambda$ represents a null or non-existent page or form.

The proof of FSA 2 shows that an FSA can be constructed from a content model that is derived from the content model specified in a !FORM/!PACKAGE command. The requirement of FSA 2, to determine if one or more page_names and/or form_names are missing from a supplied sequence of page_names and form_names that is otherwise a valid sequence within a <!FORM> or <!PACKAGE> content model, is met by making every page_name and form_name optional in the derived content model. Syntactically, this is accomplished by appending a "?" operator to every sub-expression in the content model:

| FSA 1 Content Model | FSA 2 Content Model | Regular Expression Equivalent to FSA 2 |
|---|---|---|
| page_name | page_name? | $(page\_name \mid \lambda)$ |
| form_name | form_name? | $(form\_name \mid \lambda)$ |
| $(cm_1)$ | $(cm_1)?$ | $((cm_1) \mid \lambda)$ |
| $cm_1, cm_2$ | $cm_1?, cm_2?$ | $(cm_1 \mid \lambda) \cdot (cm_2 \mid \lambda)$ |
| $cm_1 \& cm_2$ | $cm_1? \& cm_2?$ | $((cm_1 \cdot cm_2) \mid (cm_2 \cdot cm_1)) \mid \lambda$ |
| $cm_1 \mid cm_2$ | $cm_1? \mid cm_2?$ | $(cm_1 \mid cm_2 \mid \lambda)$ |
| $cm_1?$ | $cm_1?$ | $(cm_1 \mid \lambda)$ |
| $cm_1+$ | $(cm_1+)?$ | $(cm_1 \mid \lambda) \cdot cm_1^*$ |
| $cm_1^*$ | $cm_1^*$ | $cm_1^*$ |

Identifying the missing pages or forms involves recognizing whenever a $\lambda$ transition is made, then reporting the alternative to the $\lambda$ in the regular expression in the parse.

The proof of FSA 3 shows that an FSA can be constructed from a content model that is derived from the content model specified in a !FORM/!PACKAGE command. The requirement of FSA 3, to determine if all necessary page types are present according to the content model specified within a <!FORM> or <!PACKAGE> command, but the page_names and form_names are improperly sequenced. Derivation of the FSA 3 content model is accomplished by replacing all "," and "|" operators with "&". The resultant FSA accepts all input symbols in any order, but requires all to be present.

Input Document Image Processing—Partitioning

Figure 8:
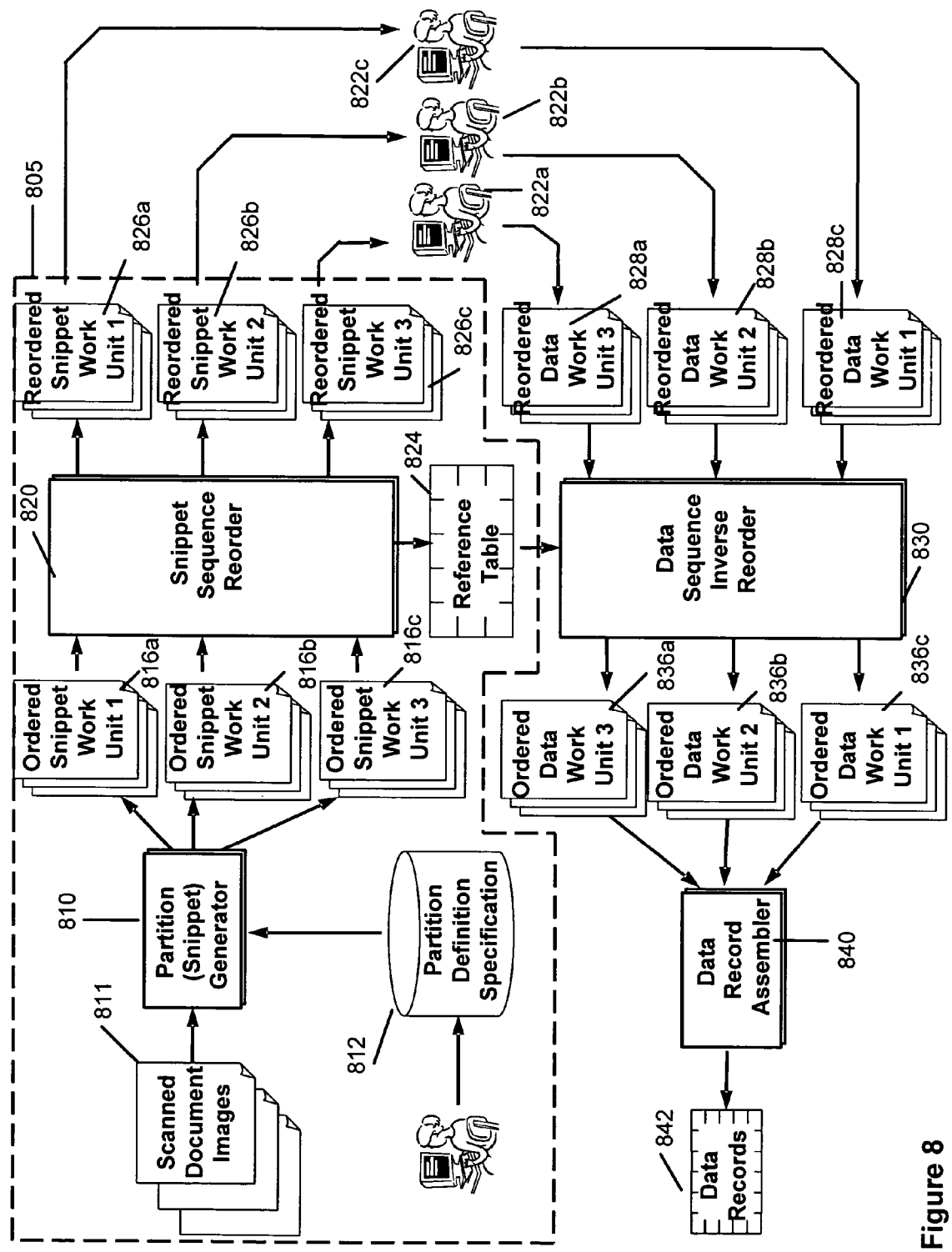
FIG. 8 is a block diagram of an embodiment of the aspects of the system which relate to partitioning the images in order to improve the security of the data.

Referring to FIG. 8, another aspect of the operation of the input document image processing module 120 will be described. FIG. 8 is a block diagram of an embodiment of the system which relate to partitioning the images in order to improve the security of the data. The elements of FIG. 8 within dashed box 805 are part of the input document image processing module 120. The other elements of the FIG. 8 are part of the document management module 140 and are included at this time for ease of explanation.

The elements of the system depicted in FIG. 8 include a Partition (Snippet) Generator module 810, a Snippet Sequence Reorder module 820, a Data Sequence Inverse Reorder module 830, and a Data Record Assembler module 840. The Data Sequence Inverse Reorder module 830 and the Data Record Assembler module 840 are part of the data entry module 130 shown in FIG. 1. The Partition (Snippet) Generator accepts a sequence of scanned document images and, using a Partition Definition Specification 812 created at step 230 as described above in connection with FIG. 2, creates two or more sequences of partitioned images. Preferably, the sequence of scanned images have already been processed by the page type identification module 312 and the sequence analyzer module 314 of FIG. 3.

The partitioned images (snippets) are derived from the scanned document images 811 by applying masks from the Partition Definition Specification 812. The masks block out one or more areas of the original scanned image thereby rendering a portion of the image unreadable. The output of the Partition (Snippet) Generator 810 is two or more sequences or work units of masked (partitioned) images. Each sequence is ordered in the sequence of the original scanned document images and each sequence is referred to as an Ordered Snippet Work Unit. In one embodiment, each Ordered Snippet Work Unit includes the one type of snippet from each of the documents in the job. Each of the Ordered Snippet Work Units 816a-c can then be directed to separate processing, such as data entry.

For ease of explanation, three Ordered Snippet Work Units and corresponding system elements are depicted in FIG. 8. However, more or fewer of such items can be created or used and the number of such elements do not have to correspond. The number of Ordered Snippet Work Units created can depend, for example, on the number of documents in a job and the size of the documents. In one embodiment, none of the Snippet Work Units 816a-c contain the full original scanned document images.

Alternatively, the creation of the snippets can be used to assign different levels of security or access to different types of snippets and the data associated with the snippets. For example, the content of selected snippet types can be encrypted. Also note that a snippet does not have to be a field. For example, a snippet can be a part of a field (the first three numbers of a social security number) and it can include multiple fields (name and address). In general, the ability to define and create snippets for documents allows for the images and data (content) associated with the snippets to be treated and processed in different ways for the same document.

In one embodiment, to prevent the operators of the data entry stations 822a-c from accidentally or deliberately matching the snippets in the Ordered Snippet Work Units to reconstruct the original scanned document image or its content, each Ordered Snippet Work Unit is processed by the Snippet Sequence Reorder module 820. The Snippet Sequence Reorder module 820 re-sequences or reorders each Ordered Snippet Work Unit. In one embodiment, the Ordered Snippet Work Units are re-ordered in such a manner such that the sequence of masked images (snippets) in each work unit is different from all other work units and different from the sequence of the original scanned document images.

To facilitate the later reassembly of data into whole records, the Snippet Sequence Reorder module 820 produces a Reference Table 824. The Reference Table 824 can be securely stored to limit access to it. The Reference Table contains the information necessary to perform a reverse of the reorder process. The Reordered Snippet Work Units 826a-c are then sent to the data entry stations 822a-c where the information from each partitioned image is keyed by operators at the work stations 822a-c to produce corresponding Reordered Data Work Units 828a-c containing the keyed data. The keyed data in the Reordered Data Work Units 828a-c is in the same order as the snippets in the Reordered Snippet Work Units 826a-c.

In one embodiment snippets that correspond to a field on the documents containing highly technical data, such as the name of a disease or a medicine, are automatically routed to an expert for verification of the entry and/or for verification that it has been correctly entered by the operator of a data entry station. For example, after such snippets have been keyed by an operator, the data and the snippet (image) are sent by the system to a trained expert to compare the data and the image for verification. The trained expert can use a data entry work station, for example, work station 822c, to perform the review and to make any necessary corrections.

The Data Sequence Inverse Reorder module 830 reorders the data in the Reordered Data Work Units into the order that matches the order or sequence of the original document image. The Data Sequence Inverse Reorder module uses the information contained within the Reference Table 824 to reorder the Reordered Data Work Units into the proper sequences. The reordered data are then written to Ordered Data Work Units 836a-c.

The Data Record Assembler 840 processes the Ordered Data Work Units to form complete data records 842 that match the sequence of the original scanned document images. The complete data records can then be further processed by the Data Record Assembler 840 according to the job specification.

In one embodiment, a spreadsheet (for example, an Excel spreadsheet) is created for the job that contains one row per original document. Each row of the spreadsheet contains the keyed data under appropriately labeled headings (for example, invoice number, invoice amount, invoice date) and a link to the original document image. The spreadsheet itself can be stored in a Windows folder on server 145 and information is added to the database by the Data Record Assembler 840 that links the job to the spreadsheet.

Additionally, the keyed data is stored in a table on server 145 associated with the job. Therefore, for each job, the job table contains a link to a data table for the job. Each row of the data table contains the keyed data for a single document plus a link to the original page image (the original page image itself being stored in a Windows folder on the server 145). Having the data table arranged this way allows the user to search for records as will be described below in connection with the Viewer 1730 shown in FIG. 17.

In one embodiment the system depicted in FIG. 1 is implemented using a computer system to implement the elements within dashed box 805. The computer system is in communication with the data entry stations 822a-c which are part of the data entry module 130. The data entry stations can communicate with the computer system by a local area network or over a greater distance by a virtual private network.

Partition (Snippet) Generation

Figure 9:
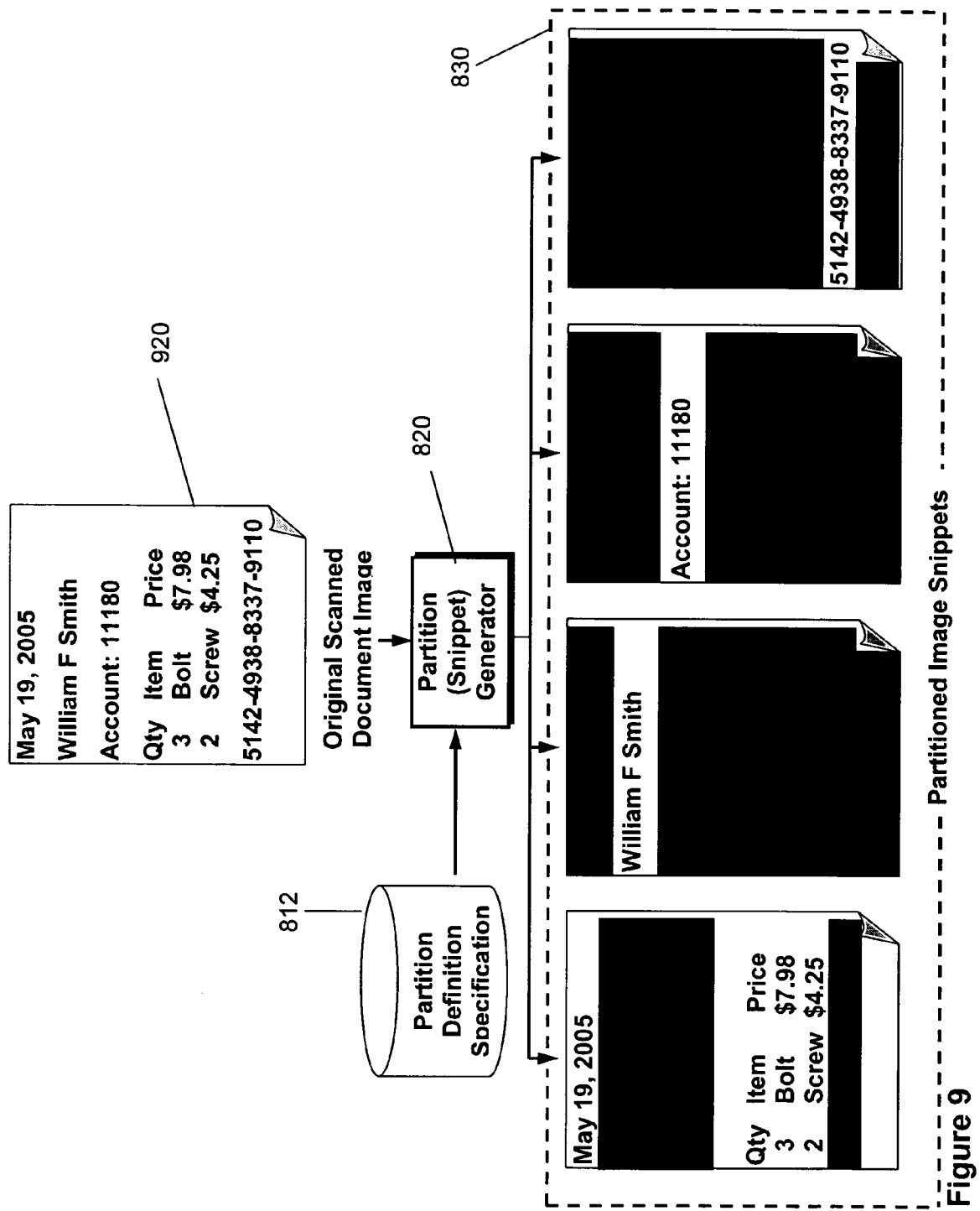
FIG. 9 is a graphical representation of the operation of the Partition (Snippet) Generator module.

A more detailed description of the operation of the Partition (Snippet) Generator module 810 will now be provided with reference to FIG. 9. FIG. 9 is a graphical representation of the operation of the Partition (Snippet) Generator module on one simple example image. In general, the function of the Partition (Snippet) Generator module 810 is partitioning (also referred to as snippet creation) of the scanned documents. Partitioning includes partitioning a document image, according to a predefined specification, into two or more partial images (snippets).

Referring to FIG. 9, the partition generation process uses the Partition Definition Specification 812. As was noted above in connection with FIG. 2, the Partition Definition Specification defines and describes the locations and dimensions of areas on an image or page that are to be partitioned. The Partition Generator 820 creates partitioned images (snippets) as defined in the Partition Definition Specification as represented in block 830. Each snippet contains a defined portion of the original image with the undefined portions of the original image masked or not included. Each snippet can be a separate image and is contained within a separate file, which may be physically or logically separated from its associated snippets for enhanced security. This process separates data which, if taken together as in the original scanned image, may compromise confidentiality.

Figure 10A:
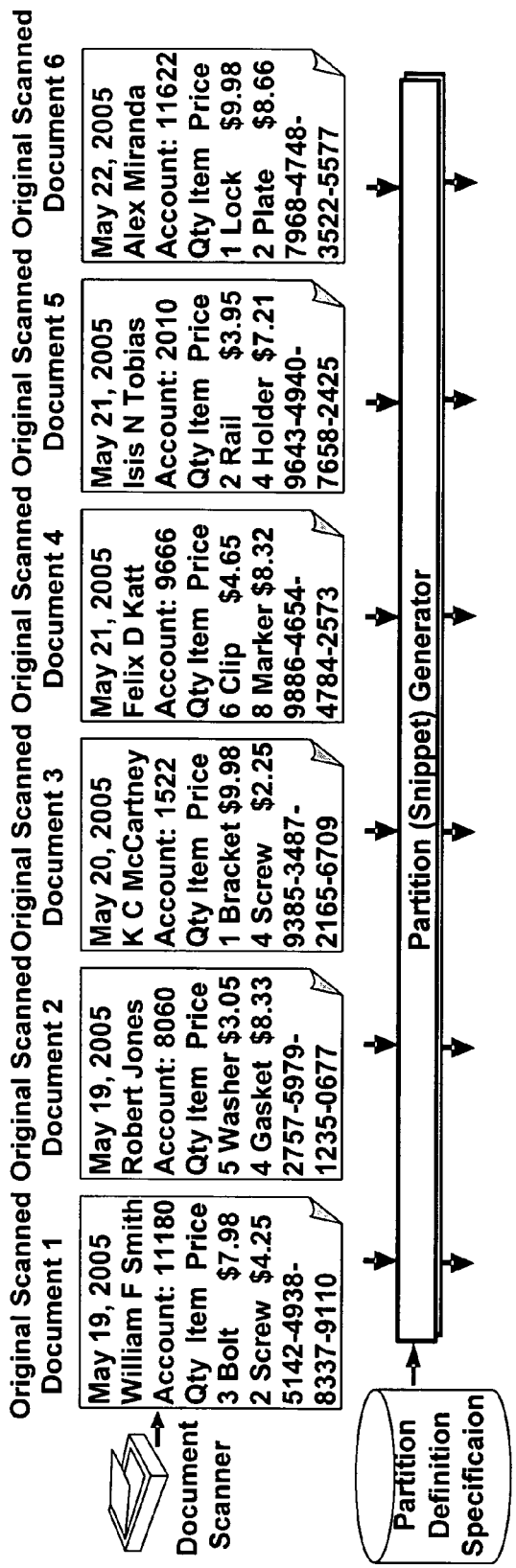

By way of example, FIGS. 10A and 10B illustrate the partition generation process performed by the Partition (Snippet) Generator module 810 applied to a set of 6 scanned document images (in this example each document is one page). In this example, each scanned document image is to be partitioned into 4 snippets according to the partition definition specification. In this example, a document scanner is used to create the scanned document images. Following the partition generation process, all snippets of the same type are grouped together (shown as rows in FIG. 10B) to form an Ordered Snippet Work Unit. Thus, snippets 1 (order and date information) for all documents are grouped to form Ordered Snippet Work Unit 1; snippets 2 (customer name) for all documents are grouped to form Ordered Snippet Work Unit 2, etc. The result is four Ordered Snippet Work Units, one for each type of snippet.

Figure 11:
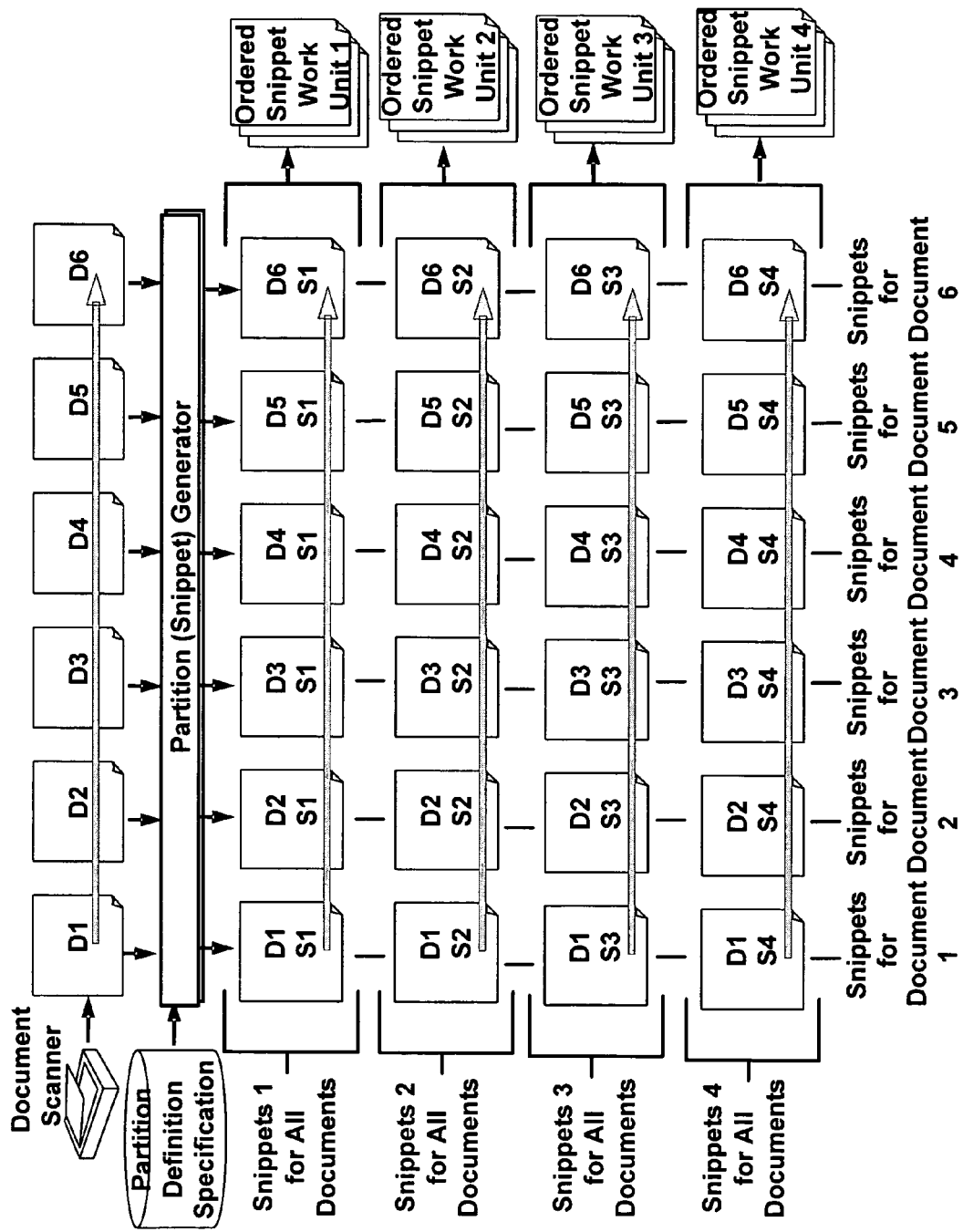
FIG. 11 presents an abstract representation of FIG. 10.

To aid in understanding the relationships and sequencing among document images and snippets, FIG. 11 presents an abstract representation of FIGS. 10A and 10B in which original document images are represented in scanned sequence by D1, D2, D3, D4, D5, and D6. Snippets are represented by notation D_S_, where an integer after the D indicates the document from which the snippet was taken and an integer after the S indicates the snippet type. For example, D3S2, in this example, would mean Snippet 2 of Document 3. As shown in FIG. 1, in this example, all of the snippets numbered 1 get grouped together, in original scanned sequence, to create Ordered Snippet Work Unit 1. Similarly, all of the snippets numbered 2 get grouped together, in original scanned sequence, to create Ordered Snippet Work Unit 2, and so on for each of the four snippet types in this example. Alternatively, Ordered Snippet Work Units could comprise a mix of snippets types.

Snippet Sequence Reordering

Figure 12:
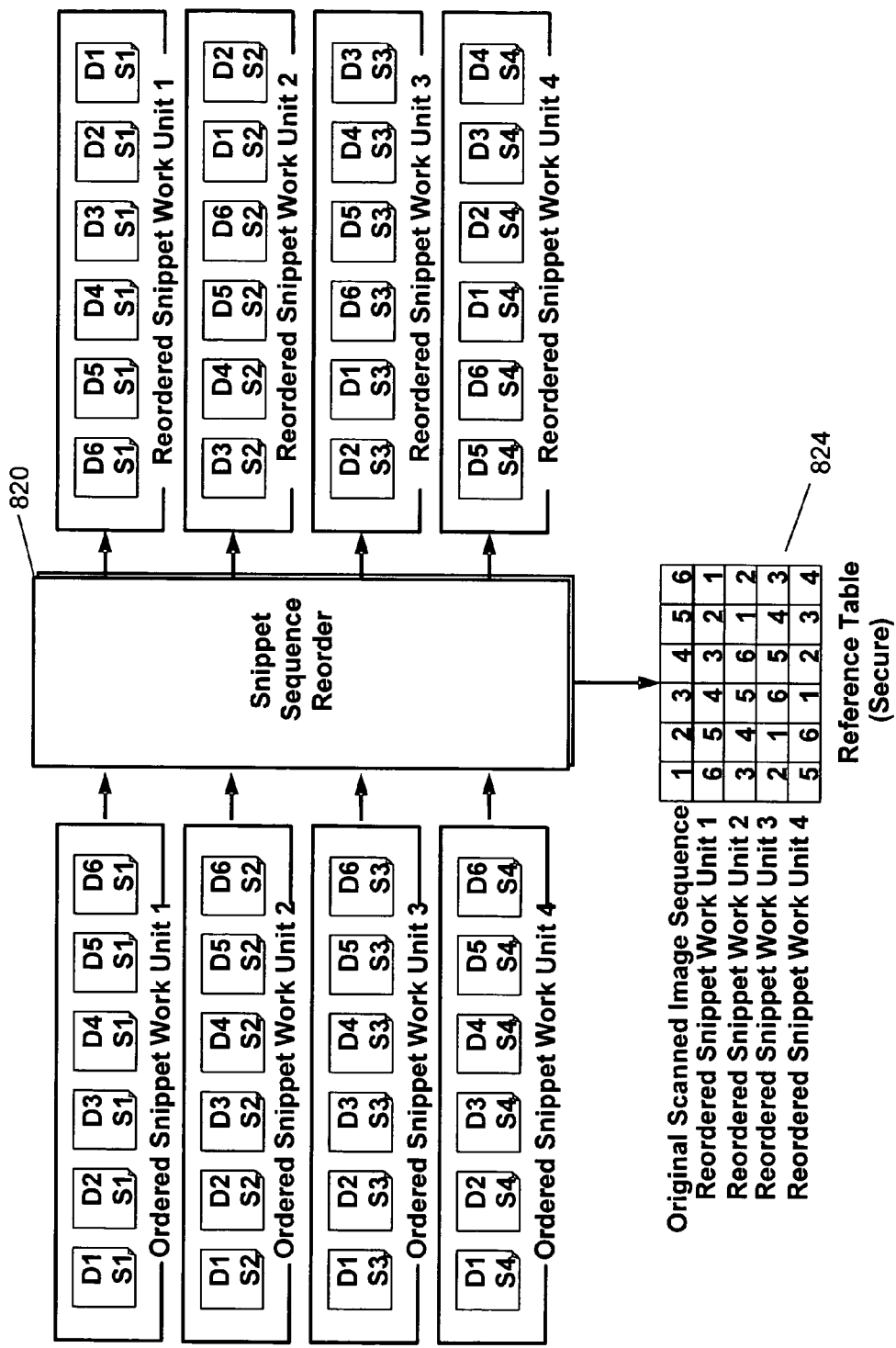
FIG. 12 illustrates the snippet sequence reorder operation for the example shown in FIGS. 10 and 11 and using the nomenclature of FIG. 11.

In order to minimize the possibility of the data entry operators, or anyone else, from being able to match the different snippets from the same document to reconstruct or partially reconstruct the corresponding original scanned document, the Snippet Sequence Reorder module 820 (see FIG. 8) reorders the snippets in each work unit with respect to the sequence of snippets in all other work units and with respect to the sequence of the original scanned document images. FIG. 12 illustrates this operation for the example shown in FIGS. 10 and 11 and using the nomenclature of FIG. 11.

To facilitate the later assembly of snippet data into complete data records, the Snippet Sequence Reorder module also generates the Reference Table 824, which can be kept in a secure computer memory location. The Reference Table contains a copy of the reordering sequences that were imposed upon the Snippet Work Units.

The reordering algorithm or process employed by the Snippet Sequence Reorder module should be carefully chosen in order to be efficient and to ensure that the sequence imposed upon a reordered work unit is different from the sequence of the original scanned document images and different from the sequences of all of the other reordered work units. One example process or algorithm that can be used by the Snippet Sequence Reorder module to satisfy those requirements is described next.

In one embodiment, an algorithm is used that takes an arbitrary number of work units and reorders the snippets within each work unit so that the snippets are presented for data entry in sequences that do not duplicate the sequence of any other work unit in the set. Mathematically, this algorithm generates a set of unique one-to-one mappings of the consecutive integers 1 to N onto themselves.

In the following discussion

S=the number of snippets into which a single document is partitioned (this also equals the number of work units created by partitioning every document in a job into S snippets);

N=the number of scanned documents in a job (this also equals the number of snippets in each work unit since all snippets of the same type are grouped together into a single work unit);

w=a specific work unit number (ranges from 1 to S, inclusive);

d=the sequence number of an original document image in the order in which the documents were originally scanned or received (ranges from 1 to N, inclusive);

RP=a set of S unique integers, each of which is relatively prime to N (a relatively prime is an integer that, taken with N, has a greatest common divisor of 1); each member of RP is referred to as $RP_w$, which associates each relative prime with a single work unit; and K(d,w)=the keying sequence number (1 to N) for the $d^{th}$ snippet in work unit w; for example, the snippet created from the $12^{th}$ originally scanned document in work unit 5 has a keying sequence number of K(12,5).

Given a set of N documents, each of which is to be partitioned into S snippets and grouped into S work units:

Step 1: For each work unit w (where $1 \leq w \leq S$), compute $RP_w$.

This yields $RP_1, RP_2, \ldots, RP_S$; that is, a unique relative prime for each work unit.

Step 2: For all snippets d (where $1 \leq d \leq N$), in all work units w (where $1 \leq w \leq S$), compute:

$$K(d,w)=((w+(d)(RP_w)-1) \text{ modulo } N)+1$$

The effect of this computation is to generate a different sequence or order of the integers 1 through N for each work unit.

Step 3: The values of K(d,w) are then used to rename (reorder) the snippet files in each work unit and are used to create the Reference Table 824 that is later used to recombine the keyed data into complete records. To illustrate the procedure, consider this example: Assume 20 input documents (N=20) are each partitioned into 5 snippets which are grouped into 5 work units (S=5). The Snippet Sequence Recorder module will derive a unique file renaming/keying order for each of the 5 work units.

Step 1: The module computes the first S=5 relative primes with respect to N=20. These are integers, which when taken with N=20, have a GCD (Greatest Common Divisor) of 1. Doing so, obtains:

$RP_1=3$
$RP_2=7$
$RP_3=9$
$RP_4=11$
$RP_5=13$

Each relative prime is taken associated with one work unit.

Step 2: Knowing N, S, and RP, the module can construct the new order or keying sequence for each work unit from the formula for K(d,w) which are shown in the table below.

| Work Unit (w) | 1 | 2 | 3 | 4 | 5 |
| --- | --- | --- | --- | --- | --- |
| $RP_w$ | 3 | 7 | 9 | 11 | 13 |
| Scan Seq (d) | Keying Sequence K(d, w) | | | | |
| 1 | 4 | 9 | 12 | 15 | 18 |
| 2 | 7 | 16 | 1 | 6 | 11 |
| 3 | 10 | 3 | 10 | 17 | 4 |
| 4 | 13 | 10 | 19 | 8 | 17 |
| 5 | 16 | 17 | 8 | 19 | 10 |
| 6 | 19 | 4 | 17 | 10 | 3 |
| 7 | 2 | 11 | 6 | 1 | 16 |
| 8 | 5 | 18 | 15 | 12 | 9 |
| 9 | 8 | 5 | 4 | 3 | 2 |
| 10 | 11 | 12 | 13 | 14 | 15 |
| 11 | 14 | 19 | 2 | 5 | 8 |
| 12 | 17 | 6 | 11 | 16 | 1 |

-continued

| | | | | | |
|---|---|---|---|---|---|
| 13 | 20 | 13 | 20 | 7  | 14 |
| 14 | 3  | 20 | 9  | 18 | 7  |
| 15 | 6  | 7  | 18 | 9  | 20 |
| 16 | 9  | 14 | 7  | 20 | 13 |
| 17 | 12 | 1  | 16 | 11 | 6  |
| 18 | 15 | 8  | 5  | 2  | 19 |
| 19 | 18 | 15 | 14 | 13 | 12 |
| 20 | 1  | 2  | 3  | 4  | 5  |

The table shows that the sequences of all work units have been reordered such that no two work units have the same new order.

In circumstances where the total number of documents (N) may not be known in advance, an arbitrarily large value of N, guaranteed to be greater than the actual number of documents, may be used. The resultant sequences of integers will include values for which no document corresponds. These non-matching integers can just be ignored, although they will produce gaps in the numeric portion of the generated filenames of the snippet files.

Data Entry

The data entry module 130 controls and facilitates the manual entry of data represented by the images of the documents. It also can create complex linked data structures which link the data with the corresponding defined fields and attributes and link the data to the corresponding document image.

Figure 13:
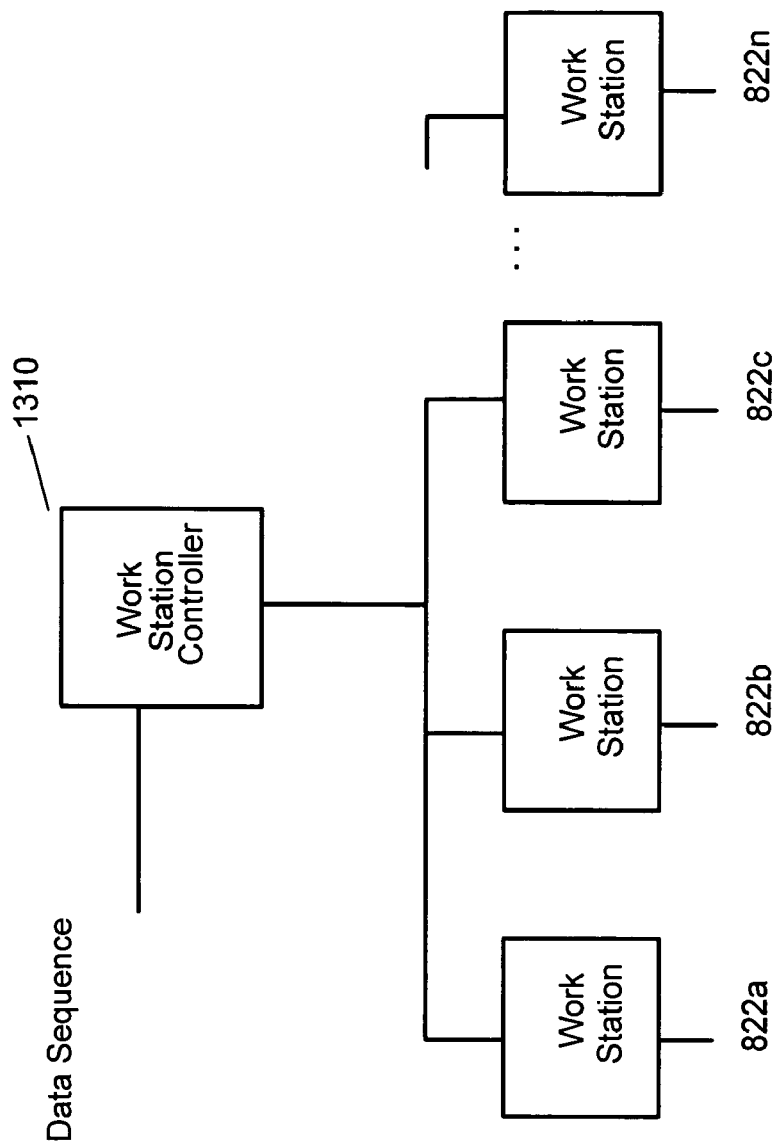
FIG. 13 depicts one embodiment of the data entry module.

FIG. 13 depicts one embodiment of the data entry module. In this embodiment, the data entry module is implemented with a work station controller module 1310 and a series of work stations 822a-n. The work station controller receives the images which require data entry to convert the images into data by operators reading the images and typing or keying the corresponding data. In one embodiment, the conversion is completely or partially accomplished electronically using optical character recognition (OCR).

In one embodiment, the work stations include two display sections. The first display section presents the document image and the second display section presents a image of a blank form. The as the operator enters data, for example, via a keyboard, it appears on the blank form. The blank form is obtained from Form Library Database 115 described above. The work station controller 1310 sequentially visually highlights each field on the image and the corresponding blank field on the blank form as the operator enters data. For example, as a new image is displayed, the controller highlights the first field on the image and on the blank form. After the data from that field is entered, the controller 1310 highlights the next field on the image and on the blank form. This process continues until data for each of the fields has been entered. The sequence of the fields can be an attribute that is assigned when the form was created by the form creation module. The visual highlighting can be, for example, brightness or a back ground color which corresponds to the area of the field.

The controller also maintains the relationships between the images and their associated fields and entered data. For example, the controller tracks the association between each image, its fields and the data for each of those fields.

In one embodiment the controller includes the data sequence inverse reorder module 830 and the data record assembler 840 shown in FIG. 8. Their operation will now be described.

Figure 14:
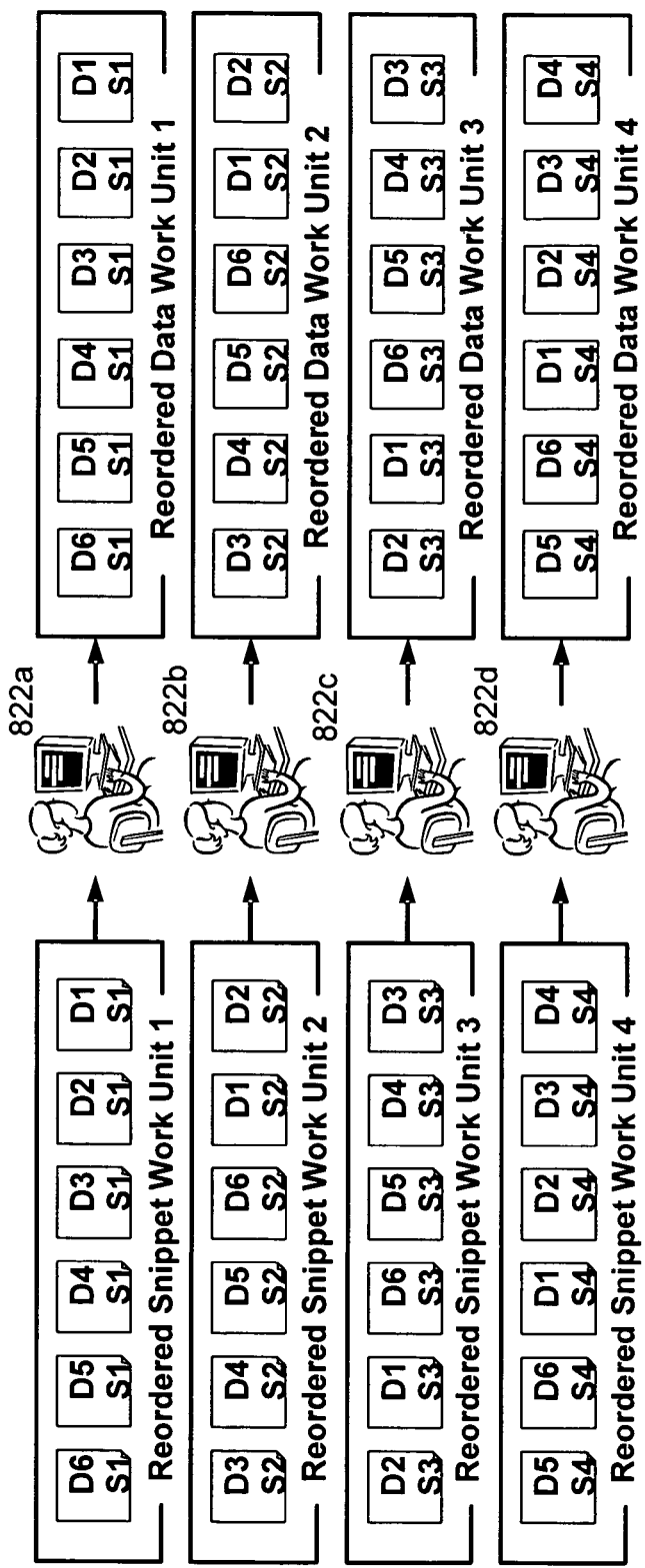
FIG. 14 is an illustration of the data entry process which converts the reordered ordered document snippets into reordered ordered data.

Following the reordering of the snippet work units by the snippet sequence reorder module 820, each work unit can be processed by data entry personnel. The data entry process, which converts the reordered document snippets into reordered data, is illustrated in FIG. 14. Operators at data entry stations 822a-d receive the reordered work units from the workstation controller 1310 and enter data into the work stations representing the snippets. The data that is entered by an operator for the snippets in a reordered work unit is the corresponding reordered data work unit.

Figure 15:
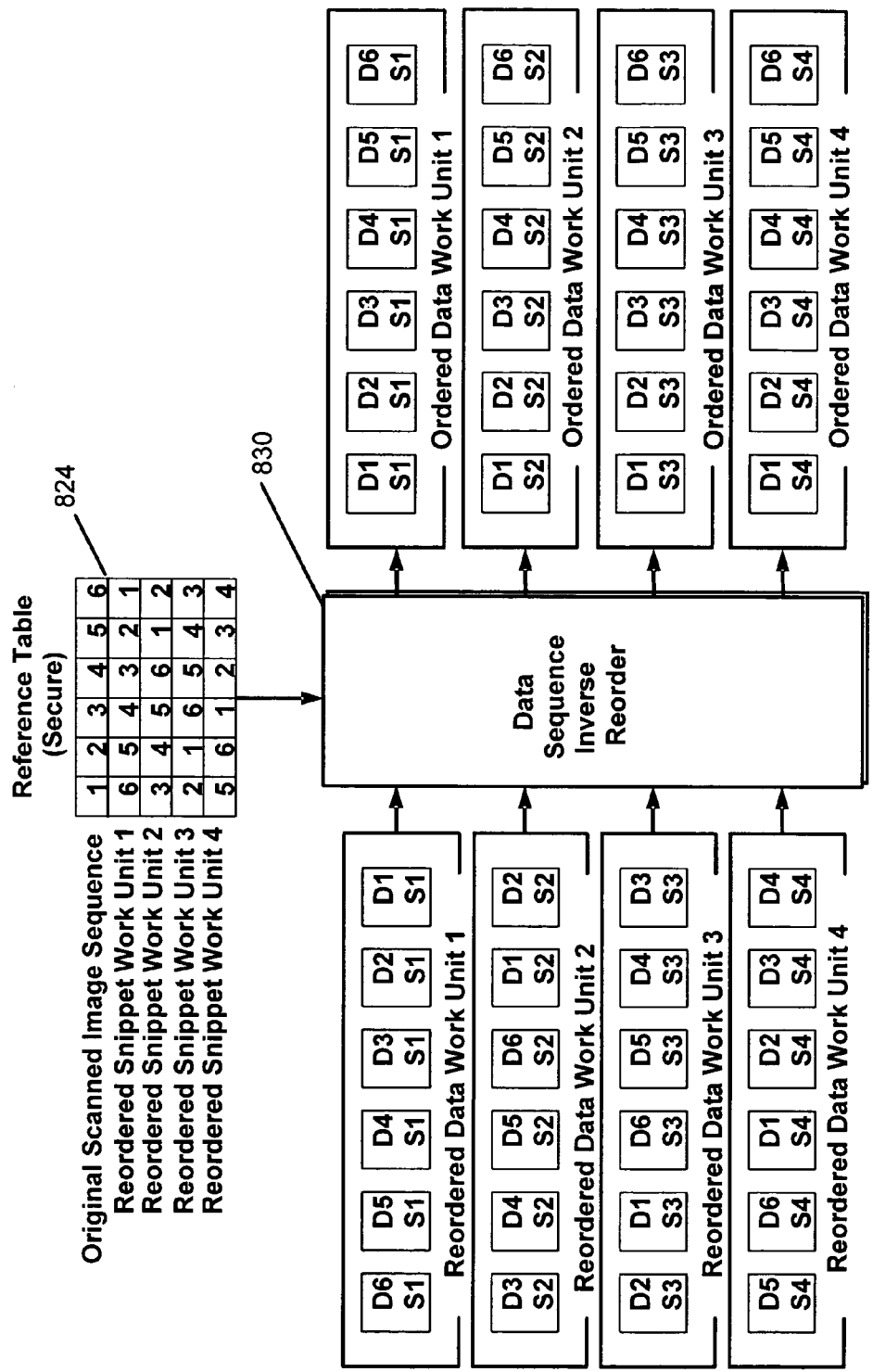
FIG. 15 illustrates the operation of the Data Sequence Inverse Reorder module.

Following data entry, the Reordered Data Work Units are typically returned to the original sequence of the scanned document images in preparation for the assembly of complete data records from the data work units. The Data Sequence Inverse Reorder module 830 (see FIG. 8) places the data in each work unit into the sequence of the original scanned document images. FIG. 15 illustrates this operation. The Data Sequence Inverse Reorder module 830 reads the Reference Table 824 that was created by the Snippet Sequence Reorder module 820 when the snippets were reordered. Using the information contained in the Reference Table, the Data Sequence Inverse Reorder module reorders or re-sequences the order of the keyed data into the sequence in which the documents were originally scanned. The ordered data work units are then passed to the Data Record Assembler module 840 (see FIG. 8).

Figure 16:
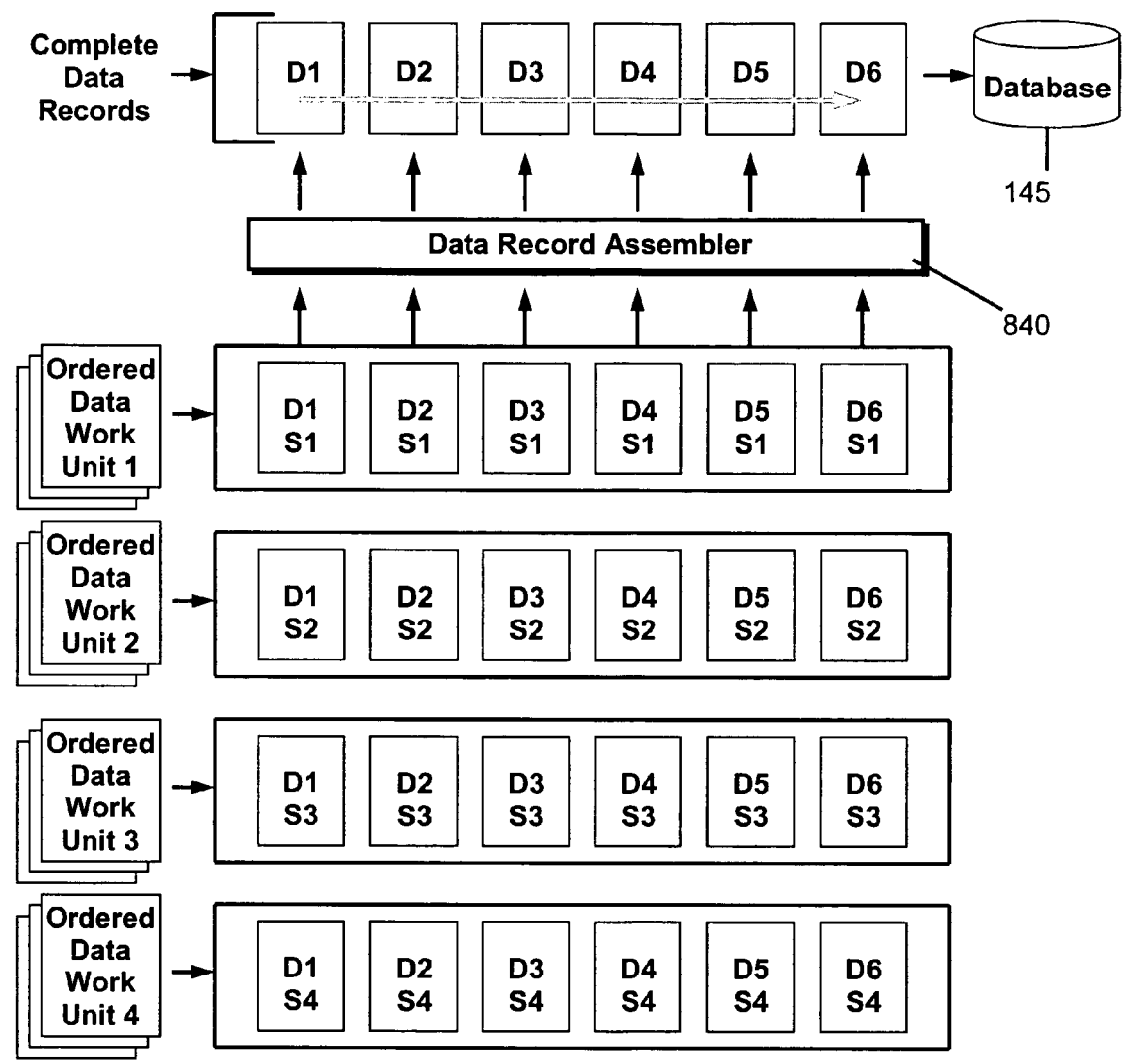
FIG. 16 is an illustration of the process performed by the Data Record Assembler module.

FIG. 16 is an illustration of the process performed by the Data Record Assembler module 840. The module receives the Ordered Data Work Units that were generated by the Data Sequence Inverse Reorder module 830 and combines the data associated with each document into a single, complete data record, as is depicted in FIG. 16, the complete data records can be stored in a data base 145 which is managed by the document management module 140 as will be described in more detail below. Alternatively, the data can be formatted and stored in different formats. For example, the individual data units can be stored along with relational information such as the document from which they were derived and the type of data they represent (type of snippet).

Document Management

Figure 17:
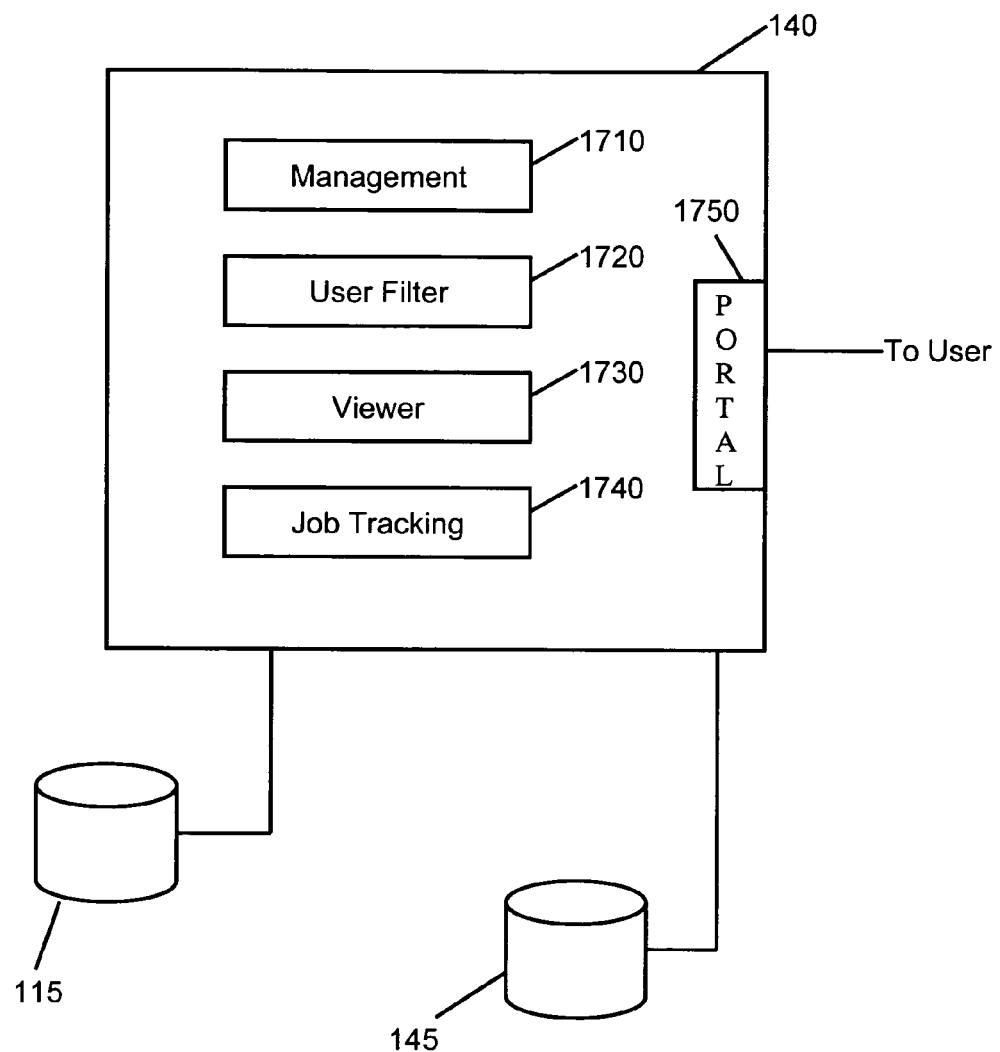
FIG. 17 is a block diagram of the functional elements of the document management module.

FIG. 17 is a block diagram of the functional elements of the document management module 140 from FIG. 1. The portal module 1750 provides an interface layer between users and the data and other modules of the system. The user can access the portal via a communication network such as the Internet, a private network or a virtual private network.

A management module 1710 provides management functions to users via the portal. The management functions include allowing users to create or define one or more job types and identify approved users and define their attributes. Job types can be stored in the data base 115. Job types are created by associating a job type identifier, which can be a sequence of letters and/or numbers, with one or more forms, snippet definitions, page specifications, sequence definitions, job processing requirements and presentation attributes. The job processing requirements can include, for example, the format of the resulting data such as a spread sheet. The forms, snippet definitions, page specifications, and sequence definitions can have been created through the form creation module 110 as was described previously.

Defining and set up to associate a one-button control with a job type is also performed by the management module 1710 with input from a user such as a document system administrator. The management module allows the administrator to select job type from the data base 115 to be associated with a button. The management module 1710 provides an interface for the document system administrator to create one or more button specifications for display, for example, on a computer display. The button specification includes an association of a named button, which will subsequently appear on the user interface, with a job type. In this manner one or more button specifications can be created.

It should be understood that a button definition can include associating a job type with many types of user input interface mechanisms. In one embodiment the button is an image, for example of a button, on a computer screen or other display screen. The button can be activated through a touch screen or by the use of a computer mouse. Alternatively, the button can be an electro-mechanical device which generates an electrical signal when manipulated by a user. Such an electromechanical device can be a key on a key board or other input system that can be assigned a function. For example, many copiers and scanners have input keys which can be assigned functions through software.

The management module allows a user to identify approved users and define their attributes. The list of approved users and their attributes can be stored in a User Attribute Database which can be implemented in the database 145. Identifying approved users can include unique alphanumeric user identifiers and passwords. The attributes that can be assigned to a user can include levels of access and a user profile.

A user filter module 1720 filters requests by users for information. The filtering is done with the attributes associated with the user and the attributes associated with the requested data. The operation of this module will be described farther below in connection with the operation of the viewer module 1730 and the job tracking module 1740.

The viewer module 1730 provides users with the ability to request and view documents and data. The following is a description of a process which can be implemented by the viewer module to allow a user to display, view, or print a copy of a scanned, filled-in form using the overlay technology previously described.

A user at a computer terminal requests to view a specified job or document through the portal 1750 to the viewer module 1730. The user's credentials (e.g., login name and password) are used to obtain the attributes associated with the user from the User Attribute Database. The User Attribute Database provides user authorization along with the access rights that have been granted to the user. This information is provided to the user filter module 1720 which performs an initial access rights check. The initial access rights check can be a comparison of the access rights of the user from the User Attribute Database against the type of job or document requested. If the initial access rights check fails, the request is denied. The Viewer 1730 sends a request to the Form Library Database 115 to return an image of the blank form (a static overlay) along with the data field identities and attributes associated with the form. The Form Library Database returns an image of the blank form (static overlay) and the data field descriptors to the Viewer.

Based upon the data field descriptors returned from the Form Library Database, as well as the identity of the specific document requested, the Document Management Module sends a request for data content to the Database 145. The Database 145 sends the requested data field contents, as individual overlays, to the User Filter 1720. The user's access rights are compared with the attributes of the fields to determine whether the user is permitted access to the data. Alternatively, this screening can occur before requesting the data. Where the rights and attributes allow, the overlays are passed to the Viewer. Where the rights and attributes do not allow, the corresponding data field overlays are not passed to the Viewer.

The Viewer combines the overlays (the blank form and the data content), for example, by performing a pixel by pixel union of the bitmaps of the overlays—both the static and the data content overlays. The resultant document image is delivered to the user via the Portal 1750. Alternatively, the user device can perform the combination function. That can decrease the amount of transmitted data when a user is viewing multiple documents having the same overlay. In such a case, the overlay can be transmitted to the user once and reused to display subsequent documents having the same overlay.

Additionally, the Viewer 1730 can display the information available to a user based upon the user's attributes. For example, as was noted above, as documents are put into the system, they can be coded as to type of document (job type) (e.g., personnel record, shipping document, purchase order, etc.). This coding can be accomplished through information in the Form Library Database 115. The coding of the documents can be used in conjunction with the attributes of a user to present the available documents in a specific manner. For example, access to documents and fields of documents can be limited. Also the same documents can be presented or grouped (e.g., using folder icons) differently for users with different attributes. For example, regional managers can be presented with folders of shipping documents limited to their regions, while account managers can be presented with folders of all shipping documents related to certain customers.

The Viewer 1730 can display the spreadsheet associated with a job. As was described above, the spreadsheet includes links which allow the user to click on the link in the spreadsheet to display the original document image. Additionally, when the user views a list of their jobs, the list is taken from the job table in the database associated with the user. When the user clicks on a particular job, the Viewer uses the link in the job table to access the spreadsheet (which is located in a standard Windows folder on the server 145), and the Viewer either opens the spreadsheet for viewing or allows the user to download the spreadsheet to their local computer. If the user chooses to view the spreadsheet via the Viewer, the user can then click on a file link in the spreadsheet to view or download an image of the original document.

Additionally, the Viewer allows a user to search for records. The Viewer displays a search page which can be accessed, for example, by the user clicking a "document search" button. Empty fields are displayed that allow the user to type search criteria. The search criteria are defined by the data fields associated with the job types. The Viewer searches the data table in the database 145 that contains the index values for the data records. Records whose index values match the search criteria are displayed to the user along with a link to the original page image. When the user clicks the link, the image is retrieved from the Windows file system and can be either viewed via the portal or downloaded to the user's local computer.

The job tracking module 1740 allows a use to track the details and status of the processing of a set of documents (a job) via the portal 1750. A job is the processing of a specified set of documents. The job tracking module 1740 receives information, for example, from the document image source 125 (see FIG. 1), the input document image processing module 120, and the data entry system 130 regarding the progress of a job. For example, the number of pages processed to date and the expected completion date can be determined by each of those modules or systems. That information can then be displayed to a user by the job tracking module 1740 via the portal. In addition, the job tracking module 1740 can provide automated notification to users of expected delays, for example, by comparing the expected progress with the actual progress reported.

In one embodiment the portal is implemented as a web browser type system which provides data to be displayed in the form of web pages. Users access the portal via an internet browser on their computer which displays information on their display screen provided by the portal. For example, on one web page, the screen displays a job number with icons relating to the job details, the job output and the original documents. Selecting the job details icon leads to the display of a page which displays the job details in summary form (e.g., job name, customer name and department) The page also includes links to pages which provide the job status, a point of contact for the job, the service level agreement for the job (e.g., the type of data entry (single or double keying) and the turn around), and details of a delivery profile. The delivery profile is the way in which the customer has requested the data be processed and the term. For example, the delivery profile can define the format for the data (e.g., data contained in the documents can be entered into an Excel spreadsheet) and the format of the delivered documents (e.g., as an image file). In each of the foregoing examples of displays, the user can select icons and open files to move through the system in a familiar manner.

Additionally as was described above, the profile or attributes of each user is used to direct the presentation of information to that user. For example, the user would only be shown information about jobs with which they are affiliated. For example Customer A would not see the jobs of Customer B. In addition, within an organization (customer), users information can be limited. For example, a manager may be provided with access to all of the jobs affiliated with that company while a lower level employee might only be provided access to selected jobs.

Use of one-button controls can be performed by the users of the document system during the course of providing document images to the system such as through the use of a digital scanning work station or computer work station. As was described above, a user can log on to the system via the portal 1750 using a web browser running on the work station, for example, using well known network logon methods. This process may involve entering a username and password, or supplying some other identifying information. The portal performs an authentication function to establish the user's identity to the document management system. The portal requests and receives from the manager module 1710 the list of buttons which the user is allowed to use or which are associated with the user. The portal sends the buttons (button definitions, e.g., as part of an HTML or other file) to the web browser which is running on the user's local computer workstation. The web browser displays the buttons to the user on the computer workstation screen.

In one embodiment, the user loads the paper documents into an electronic document scanner that is attached to the user's computer workstation. The user selects and activates, for example, by means of a mouse click, touch screen press, light pen, or other interactive mean, the button associated with the type of documents that were loaded into the scanner. In response to the button selection, the workstation sends a command to the scanner to start scanning documents. The scanner scans the documents and returns the scanned page images to the user's computer workstation. Under the control of the web browser, the user's computer workstation transmits the scanned page images and the identity of the selected button to the portal. The portal passes the scanned page images and the identity of the job type associated with the button selected by the user to the input document image processing module 120 (see FIG. 1) for processing in the manner described above. The job type associated with the selected button can be obtained from the management module.

Those of skill will further appreciate that the various illustrative logical blocks, modules, circuits, algorithms and steps described in connection with the embodiments disclosed herein can often be implemented as electronic hardware, computer-software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit without departing from the invention.

The steps of a method or algorithm described in connection with the embodiments disclosed herein can be embodied directly in hardware, in a software module executed by a processor, or in a combination of the two.

The above description of the disclosed embodiments is provided to enable any person skilled in the art to make or use the invention. Various modifications to these embodiments will be readily apparent to those skilled in the art, and the generic principles defined herein can be applied to other embodiments without departing from the spirit or scope of the invention. Thus, the invention is not intended to be limited to the embodiments shown herein but is to be accorded the widest scope consistent with the principles and novel features disclosed herein.

We claim:

1. A computerized document processing system comprising:

an input document image processing module comprising computer readable medium storing computer instructions for causing a processor to receive a group of electronic page images of documents, associate the group of electronic images of documents with a job type which includes one or more defined document types and one or more defined sequence of document images, identify the electronic images of documents as defined document types, and verify and correct defined sequences of document images;

a data entry module comprising computer readable medium storing computer instructions for causing a processor to receives the group of electronic images of documents from the document image processing module and configured to associate keyed data with the electronic image from which it was generated;

a partition generator module comprising computer readable medium storing computer instructions for causing a processor to apply two or more masks to at least one of the document images to create two or more image work units of partitioned images with each image work unit containing a predefined portion of the document image; and a document management module comprising computer readable medium storing computer instructions for causing a processor to track the progress of the group of electronic images of documents through the system, provide access via a network to the tracked progress, provide access via the network to the group of electronic images of documents and its associated keyed data.

2. The system of claim 1 further comprising;

a form creation module comprising computer readable medium storing computer instructions for causing a processor to create one or more defined document types and one or more defined sequence of document images, with defined document types including the definition of fields in documents and the association of attributes with those fields.

3. The system of claim 1 wherein the input document image processing module further comprises a snippet sequence reorder module comprising computer readable medium storing computer instructions for causing a processor to reorder each image work unit to create reordered image work units in such a manner that the sequence of partitioned images in each reordered image work unit is different from all other reordered image work units and different from the sequence of the document images and to create a reference table which defines the reordering.

4. The system of claim 3 wherein the document management module further comprises a data sequence inverse reorder module comprising computer readable medium storing computer instructions for causing a processor to receive data work units which correspond to the reordered image work units and to reorder the data in each data work unit using the information in the reference table; and a data record assembler module comprising computer readable medium storing computer instructions for causing a processor to form complete data records, from the reordered data work units, that correspond to the sequence of document images.

5. The system of claim 1 wherein the input document image processing module further comprises a page type identification module comprising computer readable medium storing computer instructions for causing a processor to analyze a sequence of page images to identify each page image by type using one or more specifications using a page type definition, the page type definition including attributes which serve to provide identifying characteristics for each type of page that is expected; and a sequence analyzer module comprising computer readable medium storing computer instructions for causing a processor to process groups page images by analyzing the page type associated with each page image in the sequence in which the associated pages were originally scanned and performing an inter-page page type relationship analysis using one or more page sequence definition specifications to determine if the pages are ordered in a valid sequence, and if the original page sequence is not valid, the sequence analyzer module determines if the page sequence can be made valid by the insertion, removal, or re-sequencing of page types.

6. The system of claim 5 wherein the document management module further comprises a portal module comprising computer readable medium storing computer instructions for causing a processor to provide an interface layer between users and the data and other modules of the system;

a management module comprising computer readable medium storing computer instructions for causing a processor to allow users to define one or more job types and identify approved users and define their attributes; and a viewer module comprising computer readable medium storing computer instructions for causing a processor to provide users with the ability to request and view documents and data.

7. A method of operating a computerized system for electronic document processing comprising:

receiving a group of electronic page images of documents;

associating the group of electronic images of documents with a job type, which includes one or more defined document types and one or more defined sequences of document images, by a user activating an interface button;

identifying the electronic images of documents as defined document types, and verify and correct defined sequences of document images;

applying two or more masks to a selected document image to create two or more image work units of partitioned images with each image work unit containing a predefined portion of the document image;

associating data with the electronic image from which it was generated;

tracking the progress of the group of electronic images of documents through the system, and providing access via a network to the tracked progress; and providing access via the network to the group of electronic images of documents and its associated keyed data.

8. The method of claim 7 further comprising creating one or more defined document types and one or more defined sequence of document images, with defined document types including the definition of fields in documents and the association of attributes with those fields.

9. The method of claim 7 further comprising reordering each image work unit to create reordered image work units in such a manner that the sequence of partitioned images in each reordered image work unit is different from all other reordered image work units and different from the sequence of the document images; and creating a reference table which defines the reordering.

10. The method of claim 9 further comprising receiving data work units which correspond to the reordered image work units;

reordering the data in each data work unit using the information in the reference table; and forming complete data records, from the reordered data work units, that correspond to the sequence of document images.

11. The method of claim 7 further comprising analyzing a sequence of page images to identify each page image by type using one or more specifications using a page type definition, the page type definition including attributes which serve to provide identifying characteristics for each type of page that is expected;

analyzing the page type associated with each page image in the sequence in which the associated pages were originally scanned and performing an inter-page page type relationship analysis using one or more page sequence definition specifications to determine if the pages are ordered in a valid sequence; and if the original page sequence is not valid, determining if the page sequence can be made valid by the insertion, removal, or re-sequencing of page types.

12. A computerized document processing system comprising:

a partition generator module comprising computer readable medium storing computer instructions for causing a processor to accept a sequence of document images and apply two or more masks to each document image to create two or more image work units of partitioned images ordered in the sequence of the document images;

a snippet sequence reorder module comprising computer readable medium storing computer instructions for causing a processor to reorder each image work unit to create reordered image work units in such a manner that the sequence of partitioned images in each reordered image work unit is different from all other reordered image work units and different from the sequence of the document images and to create a reference table which defines the reordering;

a data sequence inverse reorder module comprising computer readable medium storing computer instructions for causing a processor to receive data work units which correspond to the reordered image work units and to reorder the data in each data work unit using the information in the reference table; and a data record assembler module comprising computer readable medium storing computer instructions for causing a processor to form complete data records, from the reordered data work units, that match the sequence of document images.

13. The system of claim 12 further comprising one or more data entry stations configured to receive the reordered image work units and to output data work units which correspond to the reordered image work units.

14. A method of processing images of documents in a computerized system for electronic document processing, the method comprising:

applying two or more masks to each document image to create, in the system, two or more image work units of partitioned images ordered in the sequence of the document images;

reordering each image work unit in the system to create reordered image work units in such a manner that the sequence of partitioned images in each reordered image work unit is different from all other reordered image work units and different from the sequence of the document images and creating a reference table which defines the reordering;

creating output data work units which correspond to the reordered image work units;

reordering the data in each data work unit using the information in the reference table; and forming complete data records, from the reordered data work units, that correspond to the sequence of document images.

* * * * *